(12) United States Patent
Matsushima et al.

(10) Patent No.: US 9,091,872 B2
(45) Date of Patent: Jul. 28, 2015

(54) SEMI-TRANSMISSIVE LIQUID CRYSTAL DISPLAY DEVICE AND PORTABLE TERMINAL DEVICE

(71) Applicants: Jin Matsushima, Tokyo (JP); Hiroshi Okumura, Tokyo (JP); Ken Sumiyoshi, Tokyo (JP)

(72) Inventors: Jin Matsushima, Tokyo (JP); Hiroshi Okumura, Tokyo (JP); Ken Sumiyoshi, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 2 days.

(21) Appl. No.: 13/960,896

(22) Filed: Aug. 7, 2013

(65) Prior Publication Data

US 2014/0104520 A1 Apr. 17, 2014

Related U.S. Application Data

(62) Division of application No. 11/614,196, filed on Dec. 21, 2006, now Pat. No. 8,558,770.

(30) Foreign Application Priority Data

Dec. 22, 2005 (JP) ................................. 2005-370666

(51) Int. Cl.
*G09G 3/36* (2006.01)
*G02F 1/1335* (2006.01)
*G02F 1/13* (2006.01)

(52) U.S. Cl.
CPC ............ *G02F 1/1323* (2013.01); *G09G 3/3688* (2013.01); *G09G 2310/0297* (2013.01); *G09G 2320/0209* (2013.01); *G09G 2320/0242* (2013.01)

(58) Field of Classification Search
USPC .................................. 345/87, 102; 349/61–66
See application file for complete search history.

(56) References Cited

U.S. PATENT DOCUMENTS

| 5,654,810 | A | 8/1997 | Okamura et al. |
| 6,097,458 | A * | 8/2000 | Tsuda et al. ................. 349/113 |
| 6,281,952 | B1 | 8/2001 | Okamoto et al. |

(Continued)

FOREIGN PATENT DOCUMENTS

| JP | 09-006289 | | 1/1997 | |
| JP | 09-006289 | * | 10/1997 | ............... G09G 3/36 |

(Continued)

*Primary Examiner* — Temesgh Ghebretinsae
*Assistant Examiner* — Benyam Ketema
(74) *Attorney, Agent, or Firm* — Whitham Curtis Christofferson & Cook, PC

(57) ABSTRACT

A liquid crystal display accommodates a reflective portion with a concavo-convex reflecting pixel electrode for reflecting incident light from the display face side, and a transmissive portion with a transmissive pixel electrode for transmitting light output from the backlight. In a wide viewing angle region, luminance of the reflective portion is greater than the transmissive portion. In other angle regions, luminance of the transmissive portion is greater than the reflective portion. In a wide viewing field mode, the reflective portion and transmissive portion both perform normal display. In the narrow viewing field mode, the transmissive portion performs normal display, while the reflective portion performs cancelling data display, thereby rendering unviewable the display content of the transmissive portion from beyond a certain viewing angle. Thus, a semi-transmissive liquid crystal display device and a portable terminal device is switchable between a narrow viewing field mode and a wide viewing field mode.

4 Claims, 19 Drawing Sheets

IN NARROW VIEWING FIELD MODE

DISPLAY STATE OF VIEWING ANGLE CONTROLLER
| N | NORMAL DISPLAY OR BLACK DISPLAY
▨ BLACK DISPLAY

DISPLAY STATE OF DISPLAY PORTION
| | NORMAL DISPLAY

(56) References Cited

U.S. PATENT DOCUMENTS

| | | |
|---|---|---|
| 6,757,038 B2 | 6/2004 | Itoh et al. |
| 6,836,306 B2 | 12/2004 | Kubota et al. |
| 8,798,425 B2 * | 8/2014 | Bita et al. ............... 385/129 |
| 2003/0218664 A1 * | 11/2003 | Sakamoto et al. ........... 347/114 |
| 2004/0066477 A1 * | 4/2004 | Morimoto et al. ........... 349/113 |
| 2005/0041180 A1 * | 2/2005 | Ozawa ............... 349/98 |
| 2005/0134770 A1 | 6/2005 | Choi |
| 2005/0259193 A1 * | 11/2005 | Sumiyoshi et al. ........... 349/62 |
| 2005/0275776 A1 * | 12/2005 | Ohue et al. ............... 349/114 |
| 2007/0076147 A1 * | 4/2007 | Tanaka ............... 349/114 |
| 2007/0252927 A1 * | 11/2007 | Ichihashi et al. ........... 349/106 |
| 2011/0157253 A1 * | 6/2011 | Yamazaki et al. ........... 345/690 |

FOREIGN PATENT DOCUMENTS

| | | |
|---|---|---|
| JP | 10-153968 | 6/1998 |
| JP | 11-242226 | 9/1999 |
| JP | 2000-180819 | 6/2000 |
| JP | 2000-193962 | 7/2000 |
| JP | 2003-098325 | 4/2003 |
| JP | 2004-333879 | 11/2004 |

* cited by examiner

ELECTRODES ON TFT SUBSTRATE

ELECTRODE ON OPPOSING SUBSTRATE

VIEWING ANGLE OF 0 DEGREES IS
PERPENDICULAR TO LIQUID CRYSTAL

ELECTRODE ON
TFT SUBSTRATE

ELECTRODES ON
OPPOSING SUBSTRATE

IN WIDE VIEWING FIELD MODE

IN NARROW VIEWING FIELD MODE

IN WIDE VIEWING FIELD MODE

IN NARROW VIEWING FIELD MODE

IN WIDE VIEWING FIELD MODE

IN NARROW VIEWING FIELD MODE

DISPLAY STATE OF VIEWING ANGLE CONTROLLER

| N | NORMAL DISPLAY OR BLACK DISPLAY
| ▨ | PSEUDO-INFORMATION DISPLAY

DISPLAY STATE OF DISPLAY PORTION

| □ | NORMAL DISPLAY

IN NARROW VIEWING FIELD MODE A

IN NARROW VIEWING FIELD MODE B

DISPLAY STATE OF VIEWING ANGLE CONTROLLER

| N | NORMAL DISPLAY OR BLACK DISPLAY

▨ PSEUDO-INFORMATION DISPLAY

DISPLAY STATE OF DISPLAY PORTION

☐ NORMAL DISPLAY

IN WIDE VIEWING FIELD MODE

IN NARROW VIEWING FIELD MODE

DISPLAY STATE OF VIEWING ANGLE CONTROLLER

| N | NORMAL DISPLAY

▨ BLACK DISPLAY

DISPLAY STATE OF DISPLAY PORTION

☐ NORMAL DISPLAY

IN NARROW VIEWING FIELD MODE

IN NARROW VIEWING FIELD MODE

DISPLAY STATE OF VIEWING ANGLE CONTROLLER

[N] NORMAL DISPLAY OR BLACK DISPLAY

[▨] BLACK DISPLAY

DISPLAY STATE OF DISPLAY PORTION

[ ] NORMAL DISPLAY

SEMI-TRANSMISSIVE LIQUID CRYSTAL DISPLAY DEVICE AND PORTABLE TERMINAL DEVICE

CROSS REFERENCE TO RELATED APPLICATION

This application is a division application of application Ser. No. 11/614,196, filed on Dec. 21, 2006, now U.S. Pat. No. 8,558,770 B2.

BACKGROUND OF THE INVENTION

1. Field of the Invention

The present invention relates to a semi-transmissive liquid crystal display device and a portable terminal having a viewing angle that is switchable between a narrow viewing field mode and a wide viewing field mode.

2. Description of the Related Art

Liquid crystal display devices are widely used in direct-view monitors, projectors, and the like. In the currently used liquid crystal display devices, liquid crystals are sealed between two substrates, and the orientation of the liquid crystals is controlled by an electrical field applied to the liquid crystals, whereby information is displayed.

The liquid crystal display devices include transmissive liquid crystal display devices, in which light from a backlight is transmitted through a liquid crystal layer; reflective liquid crystal display devices that reflect outside light incident on the liquid crystal layer; and semi-transmissive liquid crystal display devices which have features of both the transmissive type and the reflective type, so as to transmit light from a backlight and to reflect incident light from the outside.

In particular, semi-transmissive liquid crystal display devices, which have both the good image quality of the transmissive type and the good ambient light visibility of the reflective type, currently constitute the mainstream in mobile device applications such as mobile phones and PDAs (Personal Digital Assistance). The semi-transmissive liquid crystal display devices can be further classified as being of internal semi-transmissive type in which light is reflected in the interior of the liquid crystal cells, or of external semi-transmissive type in which light is reflected at the exterior of the liquid crystal cells.

As one example of the internal semi-transmissive type, the liquid crystal display device disclosed in Japanese Laid-Open Patent Application 11-242226 has been proposed. FIG. 1 is a cross-sectional view schematically showing the cross sectional arrangement of a prior-art internal semi-transmissive liquid crystal element, and is based on FIG. 1 appearing in Japanese Laid-Open Patent Application 11-242226. As shown in FIG. 1, two substrates 102 are disposed facing each other over a backlight 109, with a polarizing plate 101 being provided to each of the substrates 102 on the side opposite from these opposing faces. The upper face of the first substrate disposed towards the backlight 109 comprises a reflective portion 121 provided with a concavo-convex reflecting electrode (internal reflecting electrode) 120, and a transmissive portion 122 provided with an electrode 103; the side of the second substrate that faces the first substrate is provided with an electrode 103 that extends through the reflective portion 121 and the transmissive portion 122; and a liquid crystal layer 104 is sealed between the two substrates 102. Specifically, in an internally reflective liquid crystal display element of such a design, there are provided within a single pixel a reflective portion 121 that has a concavo-convex reflecting electrode (internal reflecting electrode) 120 for reflecting incident light from the outside, and a transmissive portion 122 for transmitting the light of the backlight 109, so that both reflected light and transmitted light can be utilized for display. Since the appropriate thickness for the liquid crystals differs between the reflective portion and the transmissive portion, in most cases, liquid crystal thickness is made to differ in the respective portions. In FIG. 1, an insulating film 127 is disposed on the substrate in the reflective portion so that the gap between the concavo-convex reflecting electrode (internal reflecting electrode) 120 and the facing electrode 103 in the reflective portion 121 is smaller than the gap between the electrodes 103 in the transmissive portion 122, and the concavo-convex reflecting electrode (internal reflecting electrode) 120 is formed over the insulating film 127.

One example of the external semi-transmissive type is the liquid crystal display device disclosed in Japanese Laid-Open Patent Application 2000-180819. FIG. 2 is a cross-sectional view schematically showing the cross sectional arrangement of a prior-art external semi-transmissive liquid crystal element, and is based on FIG. 1 appearing in Japanese Laid-Open Patent Application 2000-180819. As shown in FIG. 2, the liquid crystal display device is provided with a backlight 109; over the backlight 109 two substrates 102 are arranged facing each other, electrodes 103 are provided on the opposing faces of the pair of substrates 102, and a liquid crystal layer 104 is sandwiched between the electrodes 103. A reflective polarizing plate 123 is disposed on the substrate 102 on the side that faces the backlight 109; and a polarizing plate 101 is provided so as to cover the surface of the reflective polarizing plate 123. A polarizing plate 101 is also provided to the substrate 102 that faces the first substrate. The plate is formed on the substrate side that is on the opposite side from the backlight 109. In this prior art example, transmissive display is carried out with the light of the backlight 109. During reflective display, however, specific polarized light of the light incident from the display face is reflected by the reflective polarizing plate 123, and the reflected light exits towards the observer, forming the displayed image. In this case, the transmissive portion and the reflective portion are in the same location, and a single pixel functions as a transmitting/reflective portion 124. A characteristic of systems in which reflective polarizing plates are used in the prior art is that the voltage-transmissivity curve (reflectivity) is reversed between transmissive display and reflective display.

In regard to the display element using a reflective polarizing plate disclosed in Japanese Laid-Open Patent Application 2000-193962, a description is given of a display element in which the same voltage-transmissivity (reflectivity) curves are obtained for a transmissive display and a reflective display through the use of a phase difference plate.

The liquid crystal display device disclosed in Japanese Laid-Open Patent Application 2003-098325 employs a different method based on an external reflective system. FIG. 3 is a cross-sectional view schematically showing the cross sectional arrangement of a prior-art external semi-transmissive liquid crystal element, and is based on FIG. 15 appearing in Japanese Laid-Open Patent Application 2003-098325. As shown in FIG. 3, above a backlight 109, two substrates 102 are arranged facing each other, electrodes 103 are provided to the substrates on the opposing faces thereof, and a liquid crystal layer 104 is sealed between the electrodes 103. Polarizing plates 101 are provided to each of the substrates 102 on the side opposite from their opposing faces. The polarizing plate 101 that faces the backlight 109 is provided with a semi-transmissive reflecting plate 125, which is disposed on the side of the plate that faces the backlight. The liquid crystal display element constitutes a transmitting/reflective portion 126. Specifically, in this prior-art liquid crystal display element, a semi-transmissive reflecting plate 125, rather than a polarized light reflecting plate, is disposed between the backlight 109 and the polarizing plate 101 disposed towards the backlight 109. In this case, in contrast to Japanese Laid-Open Patent Application 2000-180819, the same voltage-transmissivity (reflectivity) curves are obtained for a transmissive display and a reflective display.

In recent years, there has been a need for display devices to have a privacy protecting function whereby people other than the person viewing the device, namely, people close by, cannot view the device. For example, in the case of a banking terminal known as ATM (Automated Teller Machine) or the like, it is necessary to touch number buttons on a display device in order to input a Personal Identification Number, and such a display device must be prevented from being observed by others. Similarly, in the case of a mobile phone as well, there is a need for a function to prevent persons disposed close to the user from being able to see displayed information. Furthermore, in the case of PDAs and notebook personal computers (hereinafter also referred to as notebook PCs) as well, there is a similar need for a function to prevent nearby persons from being able to view the screen in trains or other forms of public transportation.

On the other hand, there are instances in which there is a need for a display device to be viewed by several individuals. For example, when television images are displayed on the screen of a mobile phone or the like, there are instances in which it would be desirable to show the mobile phone to a nearby individual in addition to the owner. There are also instances in which a data screen of a notebook PC is viewed by several people.

Consequently, a display device may have a narrow viewing field mode for use in individual viewing of highly confidential information, and a wide viewing field mode for use in viewing highly public information by several people. Moreover, in the case of mobile phones, PDAs, and notebook PCs, there is a need for a display device switchable between these display modes.

The liquid crystal display device disclosed in Japanese Laid-Open Patent Application 10-153968 is a display device capable of being switched between a narrow viewing field mode and a wide viewing field mode. FIG. 4 is a plan view showing the pixel arrangement of the liquid crystal display device disclosed in Japanese Laid-Open Patent Application 10-153968. FIG. 5 is the voltage-transmissivity plot for a wide viewing field area during viewing in a narrow field as described in the patent document, and FIG. 6 is the voltage-transmissivity plot for a wide viewing field area during viewing in a wide field as described in the patent document.

As shown in FIG. 4, the active matrix liquid crystal display device disclosed in Japanese Laid-Open Patent Application 10-153968 comprises a plurality of pixels 111 in which liquid crystals are sealed between transparent electrodes and are arranged in matrix form. Each pixel 111 comprises a first pixel region 112 connected to a control line 116, and a second pixel region 113 connected to the first pixel region via a capacitor 114; and a switching element 115 is provided between the first pixel region 112 and the second pixel region 113.

Here, operation when the liquid crystal mode is the TN (Twisted Nematic) mode shall be described. During viewing in a narrow field, the switching element 115 is shorted. Since the first pixel region 112 and the second pixel region 113 are directly connected, the same voltage (V1) as that of the control line 116 is fed to the first pixel region 112 and the second pixel region 113. Since the first pixel electrode in the first pixel region 112 and the second pixel electrode in the second pixel region 113 are at identical voltage, operation is the same as in normal TN mode. As shown in FIG. 5, the grayscale inversion characteristic of the TN mode appears in the voltage-transmissivity curve in the wide viewing range of the pixel 111 as a whole. This characteristic combines the voltage-transmissivity curves of the first pixel region 112 and the second pixel region 113.

On other hand, during viewing in a wide field, the switching element 115 is open. Since the first pixel region 112 and the second pixel region 113 are connected via the capacitor 114, the driving voltage applied to the control line 116 (voltage V1) is supplied unchanged to the first pixel region 112 while being supplied to the second pixel region 113 via the capacitor 114 (voltage V2). Thus, the voltage supplied to the first pixel region 112 is different from the voltage supplied to the second pixel region 113. Specifically, the second pixel voltage in the second pixel region 113 connected via the capacitor 114 has an absolute value that is less than the value of the first pixel voltage in the first pixel region 112 (|V1|>|V2|). As shown in FIG. 6, by means of applying different voltages to the first pixel region 112 and the second pixel region 113, the voltage-transmissivity curve 118 in the wide viewing range of first pixel region 112 has a waveform different from that of the voltage-transmissivity curve 119 in the wide viewing range of second pixel region 113; and the voltage-transmissivity curve 117b in the wide viewing range of the pixel 111 as a whole, which curve combines the voltage-transmissivity curve of the first pixel region 112 and the voltage-transmissivity curve of the second pixel region 113, assumes a smooth curve free from grayscale inversion.

That is, in the prior art disclosed in Japanese Laid-Open Patent Application 10-153968, the viewing angle is switched between a wide viewing field mode and a narrow viewing field mode by changing the voltage-transmissivity characteristics of the pixels and varying the viewing angle characteristics of the liquid crystal panel. Table 1 summarizes differences in the voltages applied to the first pixel region and the second pixel region in the wide viewing field mode in relation to the narrow viewing field mode. In the wide viewing field mode, the voltages applied to the first pixel region and the second pixel region are different, while in the narrow viewing field mode the voltages are the same.

TABLE 1

| Wide viewing field mode | | Narrow viewing field mode | |
| --- | --- | --- | --- |
| First pixel region Applied voltage V1 | Second pixel region Applied voltage V2 | First pixel region Applied voltage V1 | Second pixel region Applied voltage V1 |

In Japanese Laid-Open Patent Application 09-006289, there is described a liquid crystal display device wherein single pixels are composed of a plurality of sub-pixels having different orientation characteristics, with the sub-pixels being connected to control lines for independently controlling the operation thereof. The operator operates a switch whereby sub-pixels for applying control signals via a control line group are selected from the pixels, and the viewing angle of the display element is switched between a wide viewing angle designed to facilitate viewing by the operator, and a narrow viewing angle designed to prevent observation by a third party.

However, the display devices that enable switching between a narrow viewing field mode and a wide viewing field mode have problems such as the following. First, in the liquid crystal display device disclosed in Japanese Laid-Open Patent Application 10-153968, in the narrow viewing field mode of a transmissive display, grayscale inversion is produced for an observer whose views the display at a wide viewing angle. However, depending on the type of display, the observer would still be able to view the display at a wide viewing angle despite the presence of grayscale inversion. Furthermore, switching of the viewing angle in a reflective display is not disclosed in relation to this system, and no measures are envisioned that would allow the viewing angle of the semi-transmissive liquid crystal display device to be switched. In the liquid crystal display device disclosed in Japanese Laid-Open Patent Application 09-006289 as well, there is no mention of switching the viewing angles of a reflective display, and no measures are envisioned that would allow the viewing angle of the semi-transmissive liquid crystal display device to be switched.

SUMMARY OF THE INVENTION

It is an object of the present invention to provide a semi-transmissive liquid crystal display device and a portable terminal device that enable switching of the viewing angle between a narrow viewing field mode and a wide viewing field mode.

The semi-transmissive liquid crystal display device according to the present invention comprises a liquid crystal panel provided with a liquid crystal layer between two substrates having electrodes formed thereon; a backlight for outputting light to this liquid crystal panel; and a controller for controlling a voltage applied to the liquid crystal layer; wherein each pixel of the liquid crystal panel individually has a reflective portion for reflecting light incident from the display screen side, and a transmissive portion for transmitting and displaying light that is output by the backlight; both the reflective portion and the transmissive portion have wide viewing angle characteristics, and have luminance/viewing angle characteristics such that in a wide viewing angle region greater than a certain angle the luminance of the reflective portion is greater than the luminance of the transmissive portion, whereas in other angle regions the luminance of the transmissive portion is greater than the luminance of the reflective portion; and the controller controls, independently for the reflective portion and the transmissive portion, the voltage applied to the liquid crystal layer, and switches a viewing angle between a wide viewing field mode and a narrow viewing field mode by performing control so that in the wide viewing field mode the reflective portion performs normal display or dark display while the transmissive portion performs normal display, whereas in the narrow viewing field mode the reflective portion performs cancelling data display (pseudo-information display to cancel or disappear normal display by the transmissive portion) while the transmissive portion performs normal display.

In the narrow viewing field mode, an image pattern can be displayed by performing normal display or dark display in the reflective portion that makes up part of the pixel, without carrying out cancelling data display. In the narrow viewing field mode, by displaying an image pattern viewable from the wide viewing angle, styling can be improved as compared to the case where nothing is visible.

The semi-transmissive liquid crystal display device according to the present invention comprises a liquid crystal panel provided with a liquid crystal layer between two substrates having electrodes formed thereon; a backlight for outputting light to this liquid crystal panel; and a controller for controlling a voltage applied to the liquid crystal layer; wherein each pixel of the liquid crystal panel individually has a reflective portion for reflecting light incident from the display screen side, and a transmissive portion for transmitting and displaying light that is output by the backlight; each of the reflective portion and the transmissive portion has wide viewing angle characteristics and narrow viewing angle characteristics; and the controller controls, independently for the reflective portion and the transmissive portion, the voltage applied to the liquid crystal layer, and switches a viewing angle between a wide viewing field mode and a narrow viewing field mode by performing control so that in the wide viewing field mode the reflective portion performs normal display while the transmissive portion performs normal display, whereas in the narrow viewing field mode the reflective portion performs dark display while the transmissive portion performs normal display.

In the narrow viewing field mode, an image pattern can be displayed by performing normal display in the reflective portion that makes up part of the pixel, without carrying out dark display. In the narrow viewing field mode, by displaying an image pattern viewable from the wide viewing angle, styling can be improved as compared to the case where nothing is visible.

The semi-transmissive liquid crystal display device according to the present invention comprises a liquid crystal panel provided with a liquid crystal layer between two substrates having electrodes formed thereon; a backlight for outputting light to this liquid crystal panel; and a controller for controlling a voltage applied to the liquid crystal layer; wherein each pixel of the liquid crystal panel individually has a reflective portion for reflecting light incident from the display screen side, and a transmissive portion for transmitting and displaying light that is output by the backlight; each of the reflective portion and the transmissive portion has wide viewing angle characteristics and narrow viewing angle characteristics; and the controller controls, independently for the reflective portion and the transmissive portion, the voltage applied to the liquid crystal layer, and switches a viewing angle between a wide viewing field mode and a narrow viewing field mode by performing control so that in the wide viewing field mode the reflective portion performs normal display while the transmissive portion performs normal display, whereas in the narrow viewing field mode the reflective portion performs normal display while the transmissive portion performs dark display.

In the narrow viewing field mode, an image pattern can be displayed by performing normal display in the transmissive portion that makes up part of the pixel, without carrying out dark display. In the narrow viewing field mode, by displaying an image pattern viewable from the wide viewing angle, styling can be improved as compared to the case where nothing is visible.

In preferred practice, the display of the image pattern in the narrow viewing field mode will vary spatially, temporally, or spatiotemporally. By so doing, it is possible to prevent the original display content from becoming viewable due to eye adaptation.

The voltage applied to the liquid crystal layer in the reflective portion and in the transmissive portion can be independently controlled by separately providing a reflection pixel electrode formed in the reflective portion, and a transmission pixel electrode formed in the transmissive portion, and connecting the electrodes to mutually different TFTs (Thin Film Transistors).

The voltage applied to the liquid crystal layer in the reflective portion and in the transmissive portion can be independently controlled by separately providing a COM electrode formed in the reflective portion and a COM electrode formed in the transmissive portion.

The semi-transmissive liquid crystal display device according to the present invention comprises a liquid crystal panel provided with a liquid crystal layer between two substrates having electrodes formed thereon; a backlight for outputting light to this liquid crystal panel; a reflective polarizing plate or a semi-transmissive polarizing plate on the substrate disposed toward the backlight, on the side of the substrate that faces the backlight; and a controller for controlling a voltage applied to the liquid crystal layer; wherein each pixel of the liquid crystal panel individually has a first display portion and a second display portion; both the first display portion and the second display portion have wide viewing angle characteristics, and have luminance/viewing angle characteristics such that in a wide viewing angle region greater than a certain angle the luminance of the first display portion is greater than the luminance of the second display portion, whereas in other angle regions the luminance of the second display portion is greater than the luminance of the first display portion; and the controller controls, independently for the first display portion and the second display portion, the voltage applied to the liquid crystal layer, and switches a viewing angle between a wide viewing field mode and a narrow viewing field mode by performing control so that in the wide viewing field mode the first display portion performs normal display or dark display while the second display portion performs normal display, whereas in the narrow viewing field mode the first display portion performs cancelling data display while the second display portion performs normal display.

In the narrow viewing field mode, an image pattern can be displayed by performing normal display or dark display in the first display portion that makes up part of the pixel, without carrying out cancelling data display. In the narrow viewing field mode, by displaying an image pattern viewable from the wide viewing angle, styling can be improved as compared to the case where nothing is visible. Furthermore, in preferred practice, the display of the image pattern in the narrow viewing field mode will vary spatially, temporally, or spatiotemporally. By so doing, it is possible to prevent the original display content from becoming viewable due to eye adaptation.

The voltage applied to the liquid crystal layer in the first display portion and in the second display portion can be independently controlled by independently providing a first pixel electrode formed in the first display portion, and a second pixel electrode formed in the second display portion, and connecting the electrodes to mutually different TFTs. The voltage applied to the liquid crystal layer in the first display portion and in the second display portion can be independently controlled by separately providing a COM electrode formed in the first display portion and a COM electrode formed in the second display portion.

As the cancelling data, white luminance, intermediate luminance, or pseudo-colored light may be used. It suffices for the cancelling data to be any display that allows the original displayed content to be viewed beyond a specific viewing angle. By means of displaying cancelling data in the narrow viewing field mode, the original displayed content can not be viewed from a wide viewing angle due to reflected light.

A front light may be provided on the side facing the observer. By so doing, even where outside light is absent or weak, sufficient luminance will be provided by the front light, and switching of the viewing angle will function.

A louver may be provided for use in regulating the direction of exiting light incident from the backlight. By so doing, it is possible to improve the viewing angle characteristics of the narrow viewing field in the transmissive portion.

A transmitting/scattering switch element switchable between a state of transmitting incident light and a state of scattering incident light may be provided for use. By so doing, it becomes possible for the transmissive portion to switch the viewing angle by means of the transmitting/scattering switch element, and the viewing angle can be efficiently switched by the combined use of display switching in the reflective portion.

In the present invention, using the aforementioned semi-transmissive liquid crystal display device in a portable terminal device allows the user to set optimal display conditions according to the service environment of the portable terminal device.

According to the present invention, there can be provided a semi-transmissive liquid crystal display device wherein each pixel of the liquid crystal display element is separately provided with a reflective portion and a transmissive portion, making it possible to switch the viewing angle between a wide viewing field mode and a narrow viewing field mode by independently controlling the voltages applied to the liquid crystal layer in the reflective portion and the transmissive portion. Even with an external semi-transmissive liquid crystal display device in which a liquid crystal display element serves as both a reflective portion and a transmissive portion, it is possible to provide a semi-transmissive liquid crystal display device wherein each pixel is separately provided with first display portion in which reflective display is primarily used, and a second display portion in which transmissive display is primarily used, making it possible to switch the viewing angle between a wide viewing field mode and a narrow viewing field mode by independently controlling the voltages applied to the liquid crystal layer in the first display portion and second display portion. By means of the present invention, the viewing angle of a semi-transmissive liquid crystal display device having a reflective display portion can be switched in a manner not supported in the prior art.

BRIEF DESCRIPTION OF THE DRAWINGS

FIG. 8 is a schematic diagram of the electrodes on the TFT substrate and the electrode on the opposing substrate in the first embodiment, wherein

FIG. 11 is a schematic diagram of the electrode on the TFT substrate and the electrodes on the opposing substrate in the second embodiment, wherein

FIG. 16 is a cross-sectional view of an internal semi-transmissive liquid crystal display device according to a fifth embodiment of the present invention, wherein

FIG. 17 is a cross-sectional view of an internal semi-transmissive liquid crystal display device according to a sixth embodiment of the present invention, wherein

FIG. 23 is a diagram showing the operation in the viewing angle controller and the pixel units of the display portion in a narrow viewing field mode in a tenth embodiment of the present invention; wherein

FIG. 25 is a diagram showing the operation in the viewing angle controller and the pixel units of the display portion in a narrow viewing field mode in an eleventh embodiment of the present invention; wherein

DESCRIPTION OF THE PREFERRED EMBODIMENTS

Figure 1:
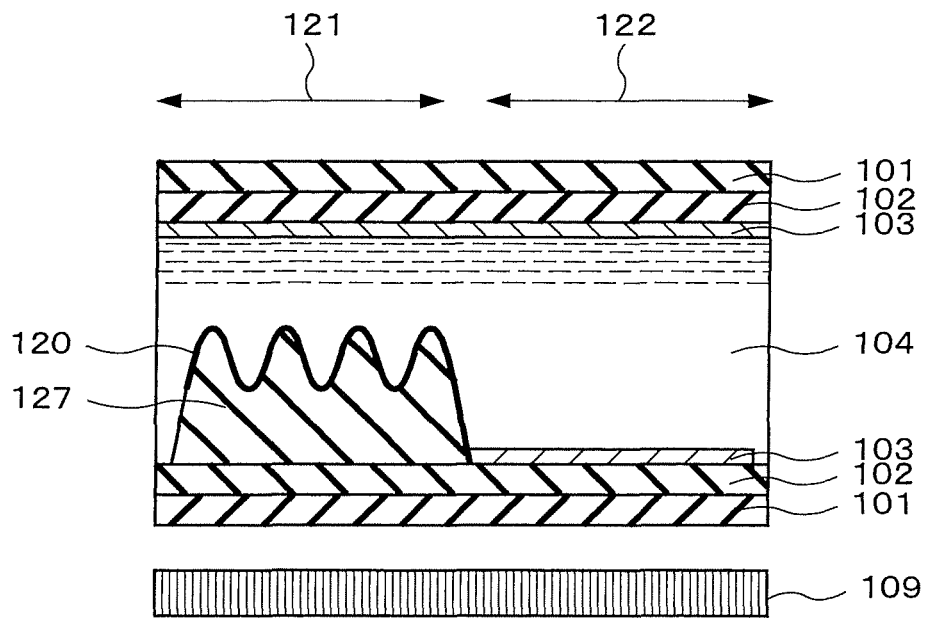
FIG. 1 is a cross-sectional view schematically showing the cross sectional arrangement of a prior-art internal semi-transmissive liquid crystal element, and is based on FIG. 1 appearing in Japanese Laid-Open Patent Application 11-242226.
Figure 2:
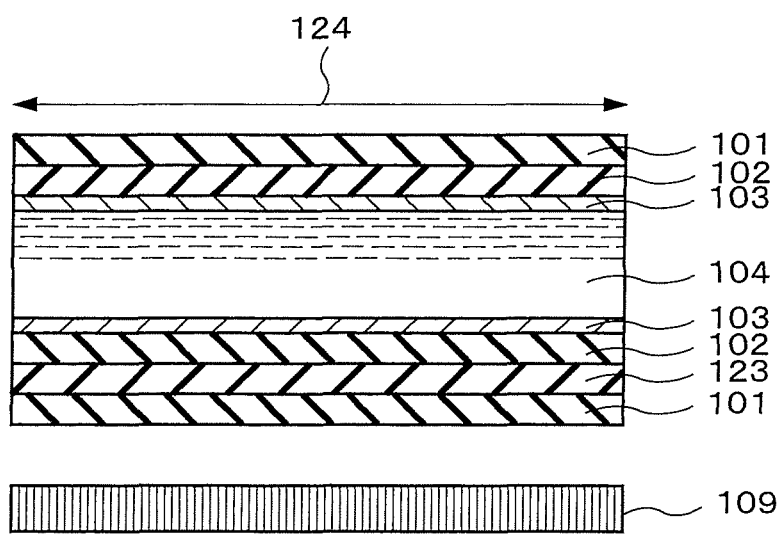
FIG. 2 is a cross-sectional view schematically showing the cross sectional arrangement of a prior-art external semi-transmissive liquid crystal element, and is based on FIG. 1 appearing in Japanese Laid-Open Patent Application 2000-180819.
Figure 3:
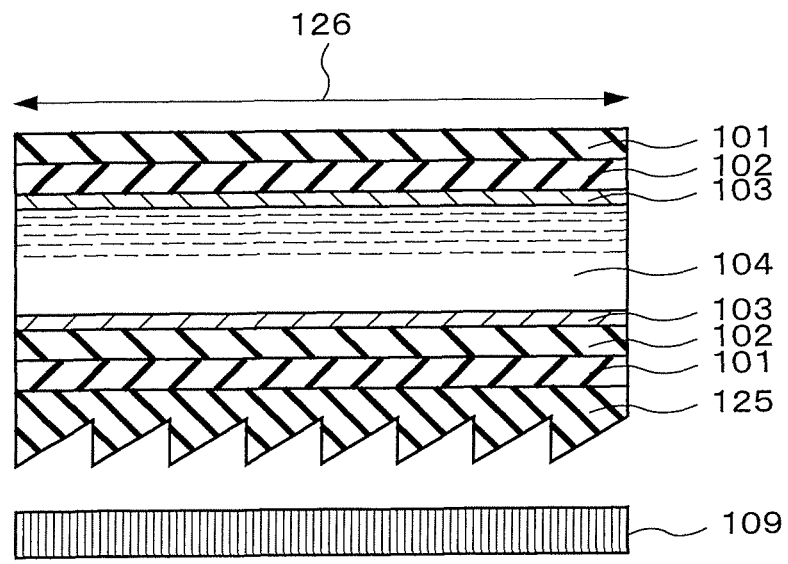
FIG. 3 is a cross-sectional view schematically showing the cross sectional arrangement of a prior-art external semi-transmissive liquid crystal element, and is based on FIG. 15 appearing in Japanese Laid-Open Patent Application 2003-098325.
Figure 4:
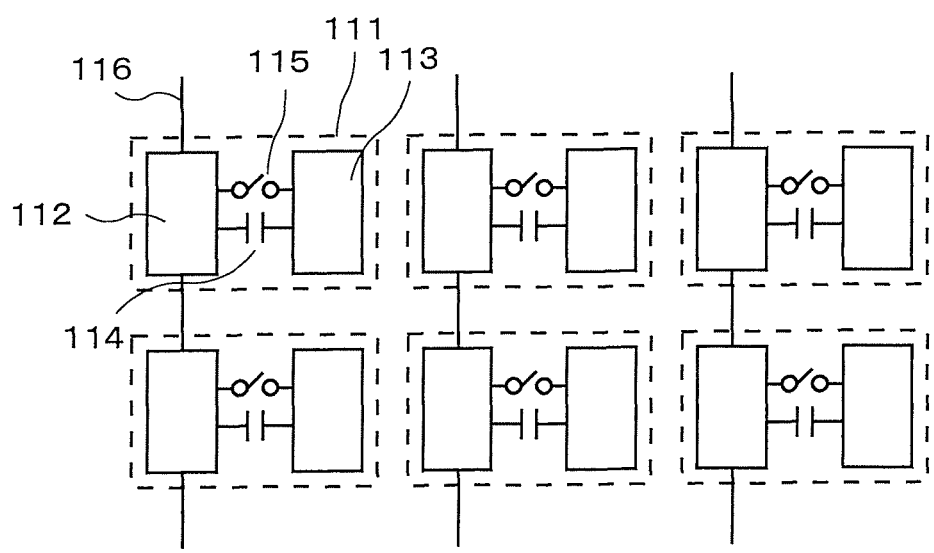
FIG. 4 is a plan view showing the pixel arrangement of the liquid crystal display device disclosed in Japanese Laid-Open Patent Application 10-153968.
Figure 5:
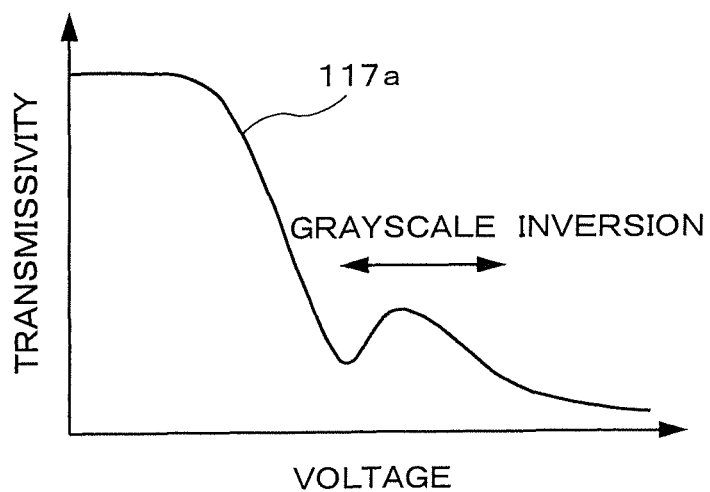
FIG. 5 is the voltage-transmissivity plot for a wide viewing field area during viewing in a narrow field as described in Japanese Laid-Open Patent Application 10-153968.
Figure 6:
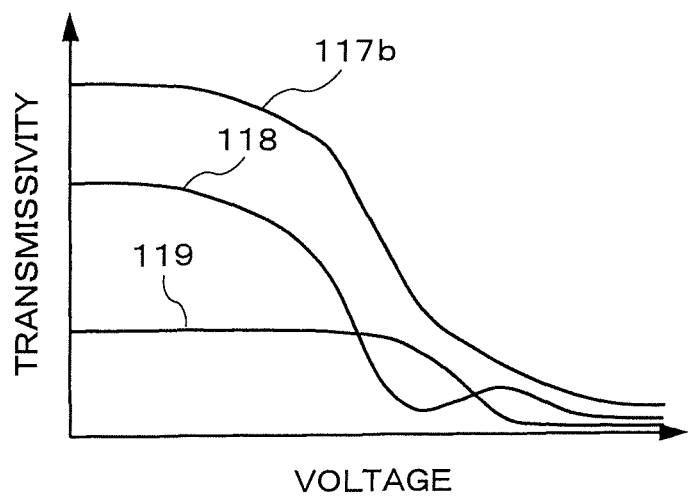
FIG. 6 is the voltage-transmissivity plot for a wide viewing field area during viewing in a wide field as described in Japanese Laid-Open Patent Application 10-153968.
Figure 7:
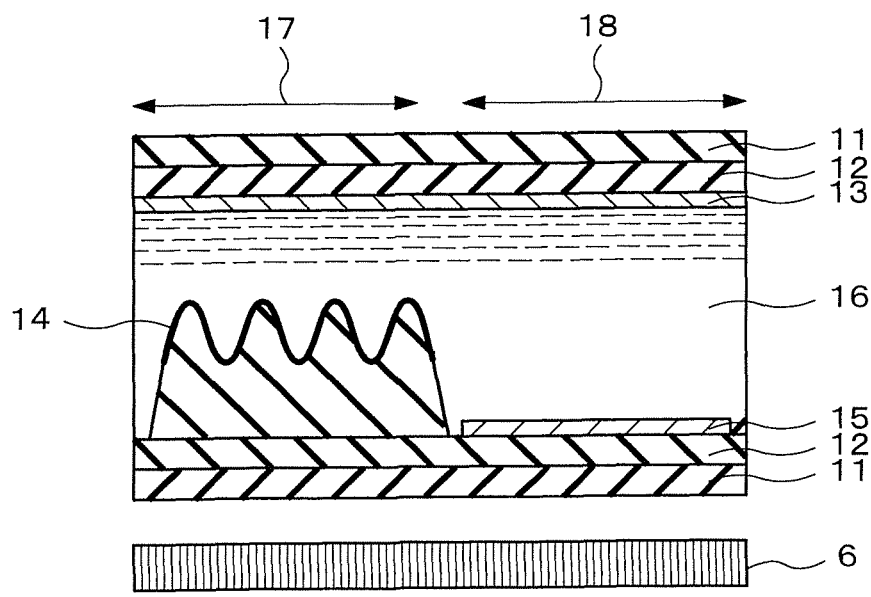
FIG. 7 is a cross-sectional view of an internal semi-transmissive liquid crystal display device according to a first embodiment of the present invention.

The semi-transmissive liquid crystal display device and portable terminal device according to the embodiments of the present invention shall be described in detail hereinbelow with reference to the drawings. First, a semi-transmissive liquid crystal display device according to a first embodiment of the invention shall be described. FIG. 7 is a cross-sectional view of an internal semi-transmissive liquid crystal display device according to the first embodiment; and FIG. 8 is a schematic diagram of the electrodes on the TFT substrate and the electrode on the opposing substrate in the first embodiment. Table 2 is a first illustration that shows operation of the reflective portion and the transmissive portion in a wide viewing field mode and a narrow viewing field mode in the first embodiment; and Table 3 is a second illustration that shows operation of the reflective portion and the transmissive portion in a wide viewing field mode and a narrow viewing field mode in the first embodiment. FIG. 9 is a curve showing the viewing angle-luminance characteristics during viewing in a narrow field in the first embodiment.

First, the design of a single pixel of the semi-transmissive liquid crystal display device according to the first embodiment shall be described using FIGS. 7 and 8. As shown in FIG. 7, two substrates 12 are arranged facing each other on top of a backlight 6, and a COM electrode 13 is disposed on the substrate 12 disposed towards the observer (the upper side in the drawing), which is the direction that light exits the backlight (this substrate shall be termed the opposing substrate), and on the side of the substrate that faces the backlight 6. The substrate 12 that is disposed towards the backlight 6 is provided, on the side facing the opposing substrate, with a concavo-convex reflecting pixel electrode (internal reflecting plate) 14 whose surface has a concavo-convex shape and which reflects light incident from the observer side, and a transmissive pixel electrode 15 for transmitting light that is output by the backlight 6 (this substrate shall be termed the TFT substrate). The liquid crystal panel of the liquid crystal display device in the present embodiment thus comprises a reflective portion 17 provided with the concavo-convex reflecting pixel electrode (internal reflecting plate) 14, and a transmissive portion 18 provided with the transmissive pixel electrode 15. A liquid crystal layer 16 is sandwiched between the two substrates, but since the reflective portion 17 and the transmissive portion 18 have different optimal liquid crystal thicknesses, a step is provided along the TFT substrate so that the gap between the concavo-convex reflecting pixel electrode 14 and the COM electrode 13 in contraposition thereto is smaller than the gap between the transmissive pixel electrode 15 and the COM electrode 13 in contraposition thereto, whereby the liquid crystal of the reflective portion 17 is made thinner. In FIG. 7, the step has been produced on the TFT substrate, but the step could be disposed on the opposing substrate instead. The opposing substrate and the TFT substrate are bonded together with the liquid crystal layer 16 sandwiched therebetween, and polarizing plates 11 are disposed on the opposing substrate and on the TFT substrate, on the sides of the substrates that are opposite from the opposing faces thereof.

Figure 8A:
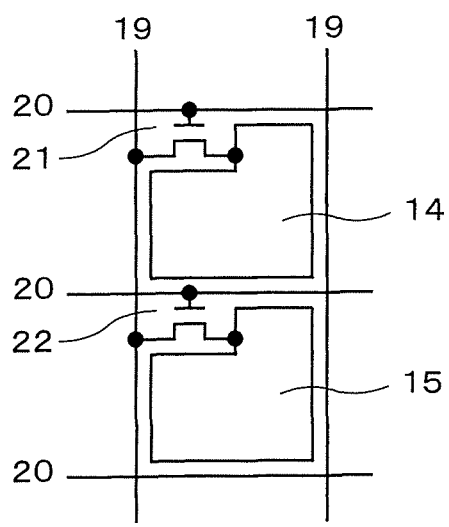
FIG. 8A is a schematic plan view of the electrodes on the TFT substrate.
Figure 8B:
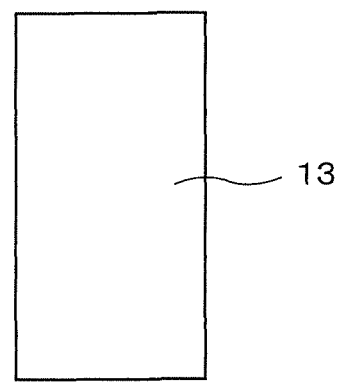
FIG. 8B is a schematic plan view of the electrode on the opposing substrate.
Figure 9:
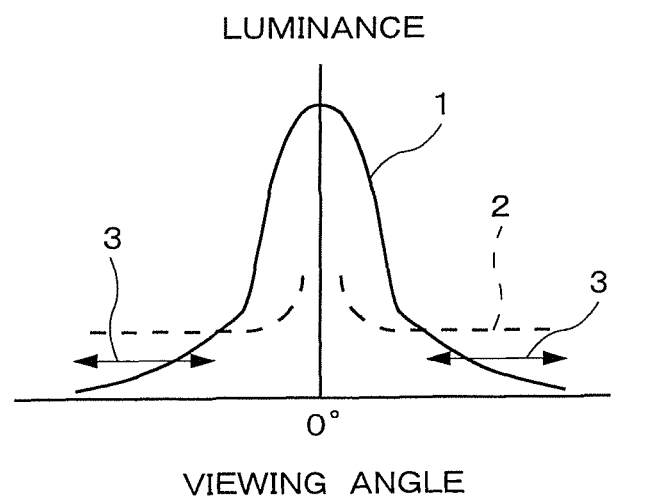
FIG. 9 is a curve showing the viewing angle-luminance characteristics during viewing in a narrow field in the first embodiment of the present invention.

FIG. 8A is a schematic plan view of the electrodes on the TFT substrate, and shows the structure of the electrodes on the TFT substrate shown in FIG. 7 as viewed from the upper face of the substrate. As shown in FIG. 8A, the concavo-convex reflecting pixel electrode (internal reflecting plate) 14 and the transmissive pixel electrode 15 are disposed in sections defined by grid-form data lines 19 and gate lines 20, respectively. A concavo-convex reflecting pixel electrode TFT 21 is formed in proximity to the intersection point of the data line 19 and the gate line 20 in the section in which the concavo-convex reflecting pixel electrode (internal reflecting plate) 14 is disposed, and the concavo-convex reflecting pixel electrode (internal reflecting plate) 14 is connected to the source electrode of the concavo-convex reflecting pixel electrode TFT 21. Similarly, a transmissive pixel electrode TFT 22 is formed in proximity to the intersection point of the data line 19 and the gate line 20 in the section that accommodates the transmissive pixel electrode 15, and the transmissive pixel electrode 15 is connected to the source electrode of the transmissive pixel electrode TFT 22. That is, in order to make it possible to apply different voltages to the reflective portion 17 provided with the concavo-convex reflecting pixel electrode (internal reflecting plate) 14 and to the transmissive portion 18 provided with the transmissive pixel electrode 15, different TFTs are connected to the concavo-convex reflecting pixel electrode 14 and the transmissive pixel electrode 15. FIG. 8B is a schematic plan view of the electrode on the opposing substrate. As shown in FIG. 8B, the COM electrode 13 on the opposing substrate is shared by the reflective portion 17 and the transmissive portion 18.

Next, the operation of the first embodiment shall be described using FIG. 7, Table 2, and FIG. 9. Where display is performed with the semi-transmissive liquid crystal display device of the present embodiment, light incident on the display face from the observer side in the reflective portion 17 is passed through the liquid crystal layer 16, is subsequently reflected by the concavo-convex reflecting pixel electrode (internal reflecting plate) 14, is then again passed through the liquid crystal layer 16, and is output as display light from the display face. Meanwhile, in the transmissive portion 18, light that is output from the backlight 6 passes through the transmissive pixel electrode 15, and after passing through the liquid crystal layer 16 is output as display light from the display face. At this time, the voltages across the electrodes in the reflective portion 17 and the transmissive portion 18 are controlled independently, whereby the orientation of the liquid crystals in the reflective portion 17 and the transmissive portion 18 can be controlled, making it possible to control the display conditions. The transmissive portion has the viewing angle characteristics of the wide viewing field that allow wide-viewing field display to be maintained in an independent manner.

TABLE 2

| Wide viewing field mode | | Narrow viewing field mode | |
| --- | --- | --- | --- |
| Reflective portion Normal display | Transmissive portion Normal display | Reflective portion Bright | Transmissive portion Normal display |

As shown in Table 2, in a wide viewing field mode, the transmissive portion performs normal display, and the reflective portion performs normal display as well. In a narrow viewing field mode, on the other hand, the transmissive portion performs normal display, but the reflective portion assumes the bright condition (white display). As shown in FIG. 9, by designing the luminance 2 of the reflective portion so as to be greater than the luminance 1 of the transmissive portion with respect to viewing angles greater than a specific angle (i.e., the range 3 of restricted viewing angles), the display content of the transmissive portion becomes unviewable from within the range 3 of restricted viewing angles. That is, the reflective portion can be represented as a viewing angle controller, and the transmissive portion as the display portion. Consequently, switching between the wide viewing field mode and the narrow viewing field mode is possible by switching the display of the reflective portion (viewing angle controller). In FIG. 9, a viewing angle of 0° represents the direction perpendicular to the liquid crystal panel.

In a narrow viewing field mode the reflective portion is not limited to the bright condition (white display) of the three pixels R (red), G (green), and blue (B), and an intermediate luminance or a pseudo-color display is acceptable instead as long as the display content of the transmissive portion is unviewable from within the range 3 of restricted viewing angles.

In the first embodiment, in a wide viewing field mode, the transmissive portion may perform normal display while the reflective portion performs dark display (black display), as shown in Table 3. In the case of Table 2, normal display is performed in the reflective portion in a wide viewing field mode, whereby it is possible for display content to be viewed by means of outside light, whereas in the case of Table 3, the reflective portion does not perform normal display in a wide viewing field mode, making it difficult for display content to be viewed by means of outside light.

TABLE 3

| Wide viewing field mode | | Narrow viewing field mode | |
| --- | --- | --- | --- |
| Reflective portion Dark | Transmissive portion Normal display | Reflective portion Bright | Transmissive portion Normal display |

The liquid crystal mode for operating in a vertical electric field is preferably a wide-viewing angle VA (Vertical Alignment) mode. Examples of VA modes are multi-domain ones affording reduced viewing angle dependence, such as the MVA (Multi-domain Vertical Alignment) format, the EVA (Patterned Vertical Alignment) format, and the ASV (Advanced Super V) format. Furthermore, the present invention is suitable for use in liquid crystal display panels of a film-compensated TN mode.

According to the present embodiment, there can be provided a semi-transmissive liquid crystal display device wherein each pixel of the liquid crystal display element is separately provided with a reflective portion and a transmissive portion, making it possible to switch the viewing angle between a wide viewing field mode and a narrow viewing field mode by independently controlling the voltages applied to the liquid crystal layer in the reflective portion and the transmissive portion. By means of the present embodiment, the viewing angle of a semi-transmissive liquid crystal display device having a reflective display portion can be switched in a manner not supported in the prior art.

Figure 10:
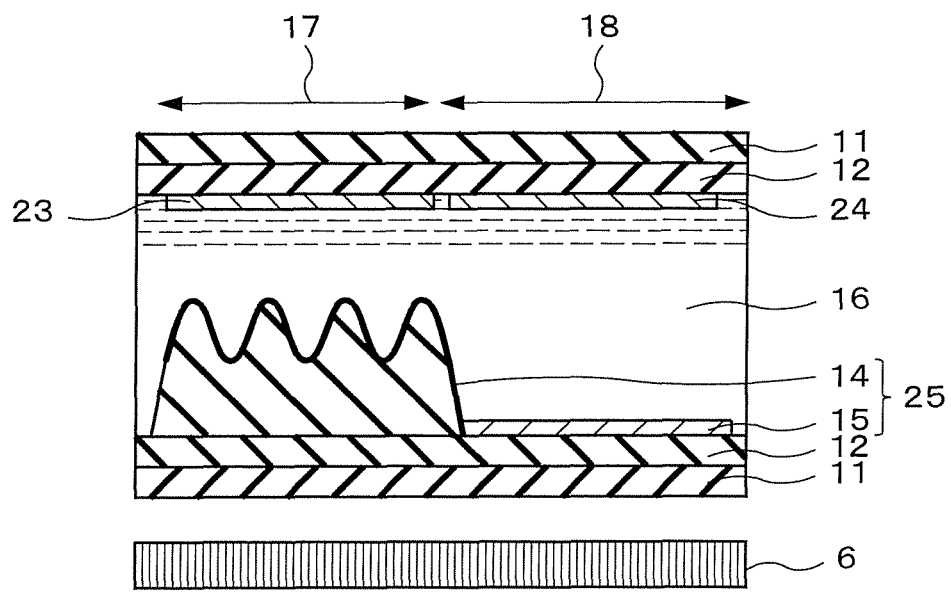
FIG. 10 is a cross-sectional view of an internal semi-transmissive liquid crystal display device according to a second embodiment of the present invention.

Next, a second embodiment of the present invention shall be described. In the first embodiment, the pixel electrodes of the reflective portion and the display portion on the TFT substrate are connected to different TFTs, making possible independent control of the voltages of the reflective portion and the display portion. In the second embodiment of the present invention, a pixel electrode is shared by the reflective portion and the display portion on the TFT substrate and is controlled by a single TFT, while the COM electrode of the reflective portion and the COM electrode of the display portion of the display portion are separate. FIG. 10 is a cross-sectional view of an internal semi-transmissive liquid crystal display device according to the second embodiment. FIG. 11 is a schematic diagram of the electrode on the TFT substrate and the electrodes on the opposing substrate in the second embodiment.

Figure 11A:
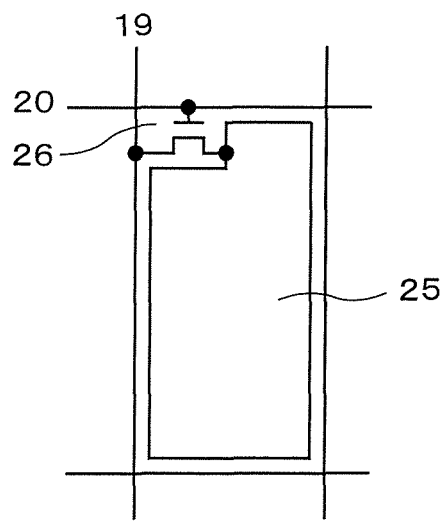
FIG. 11A is a schematic plan view of the electrode on the TFT substrate.
Figure 11B:
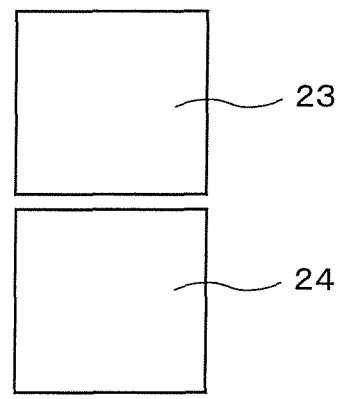
FIG. 11B is a schematic plan view of the electrodes on the opposing substrate.

The arrangement of the second embodiment shall be described using FIGS. 10 and 11. The elements in FIG. 10 that are identical to those in FIG. 7 have been assigned identical symbols, while the elements in FIG. 11 that are identical to those in FIG. 8 have been assigned identical symbols and shall not be discussed in detail. As shown in FIG. 10, the concavo-convex reflecting pixel electrode (internal reflecting plate) 14 disposed on the substrate 12 is shorted with the transmissive pixel electrode 15 to form a single pixel electrode 25. Consequently, as shown in FIG. 11A, a single pixel electrode TFT 26 will suffice as the TFT for connection to the pixel electrode 25. On the other hand, as shown in FIGS. 10 and 11, the opposing substrate is provided with the COM electrodes as a separate COM electrode 23 of a reflective portion and a separate COM electrode 24 of a transmissive portion. These electrodes are provided respectively to the reflective portion 17 and the transmissive portion 18, making it possible for different voltages to be applied to these portions in a respective fashion.

Since the COM electrode 23 of the reflective portion and the COM electrode 24 of the transmissive portion are made separate in this way, it is possible to independently control the voltages of the reflective portion and the transmissive portion, thereby affording operation and working effects analogous to those of the first embodiment.

Figure 12:
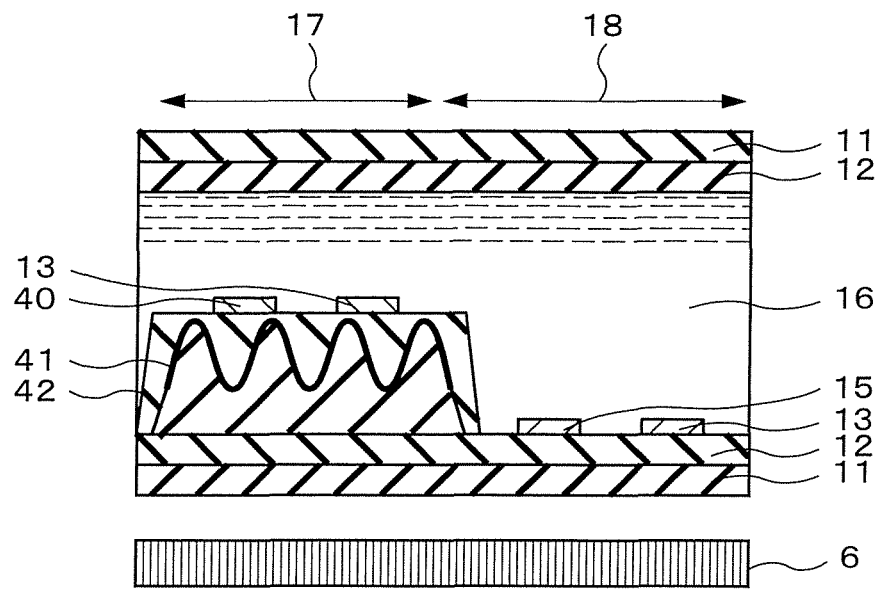
FIG. 12 is a cross-sectional view of an internal semi-transmissive liquid crystal display device according to a third embodiment of the present invention.
Figure 13:
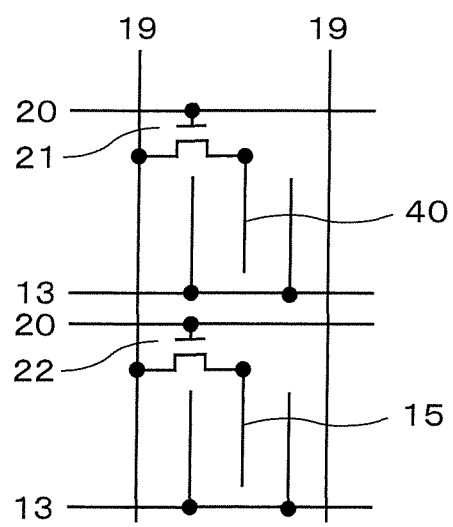
FIG. 13 is a schematic diagram of the electrodes on the TFT substrate in the third embodiment.

Next, a third embodiment of the present invention shall be described. Whereas the first embodiment employs a mode in which the liquid crystals are operated in a vertical electric field, the third embodiment of the present invention differs therefrom in that the liquid crystals are operated in a lateral electric field. FIG. 12 is a cross-sectional view of an internal semi-transmissive liquid crystal display device according to the third embodiment. FIG. 13 is a schematic diagram of the electrodes on the TFT substrate in the third embodiment.

The arrangement of the third embodiment shall be described using FIGS. 12 and 13. In FIG. 12, elements identical to those in FIG. 7 have been assigned identical symbols and shall not be discussed in detail. As shown in FIG. 12, the liquid crystal panel is disposed above a backlight 6, and the substrate 12 disposed towards the backlight 6 comprises a reflective portion 17 in which an internal reflecting plate 41 is formed, and also comprises a transmissive portion 18 for transmitting light that is output from the backlight. In the IPS (In Plane Switching) mode of operation in a lateral electric field in a direction horizontal in relation to the substrate, it is preferable for the liquid crystal interface to be planar, and for this reason a planarizing film 42 is formed over the internal reflecting plate 41. A reflective pixel electrode 40 and a COM electrode 13 are formed in a comb-tooth configuration on the planarizing film 42; and a transmissive pixel electrode 15 and a COM electrode 13 are formed in a comb-tooth configuration on the substrate 12 in the transmissive portion 18. The structure of these electrodes is shown in plan view from the upper face of the substrate in FIG. 13. As shown in FIG. 13, the reflective portion 17 and the transmissive portion 18 are partitioned by data lines 19 and gate lines 20 disposed in a grid arrangement, with the electrodes being formed in a comb-tooth configuration in the regions. In the present embodiment, while the COM electrodes of the reflective portion 17 and the transmissive portion 18 are at the same potential, the reflective pixel electrode 40 and the transmissive pixel electrode 15 are connected to a reflective pixel electrode TFT 21 and a transmissive pixel electrode TFT 22, respectively, so that the voltages of the reflective portion 17 and the transmissive portion 18 are controllable independently. Since it is possible to independently control the voltages of the reflective portion and the transmissive portion, the operation and working effects are analogous to those of the first embodiment.

While the arrangement and placement of electrodes would differ somewhat, this design could be used favorably in similar embodiments such as the FFS (Fringe Field Switching) format or AFFS (Advanced Fringe Field Switching) format.

Figure 14:
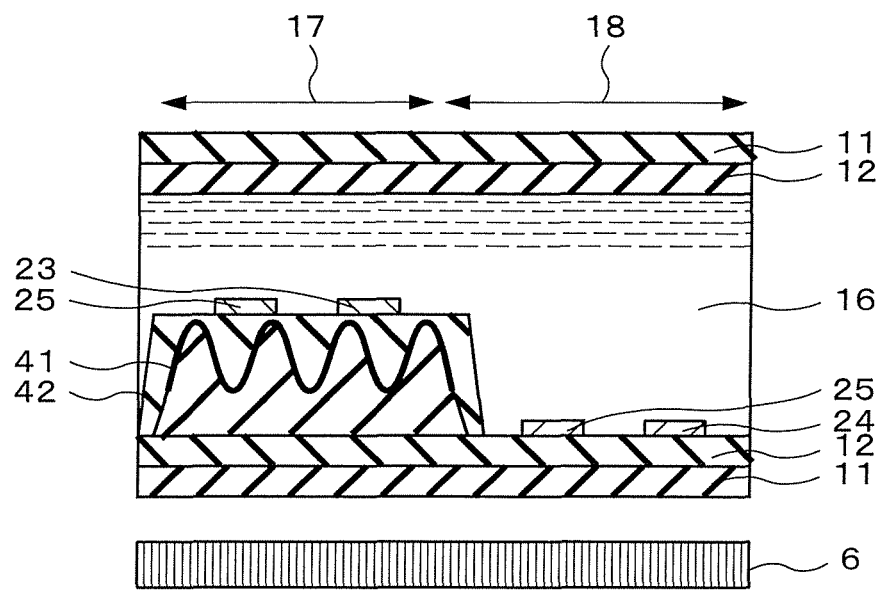
FIG. 14 is a cross-sectional view of an internal semi-transmissive liquid crystal display device according to a fourth embodiment of the present invention.
Figure 15:
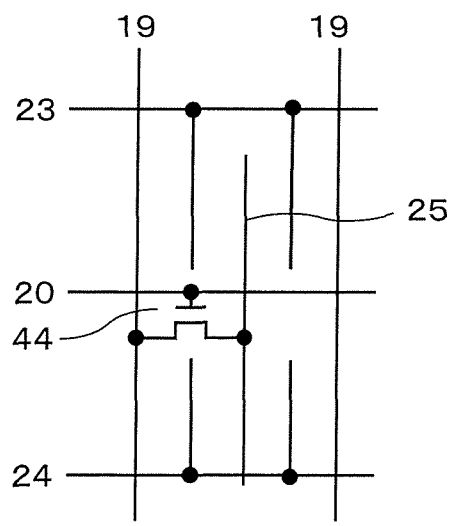
FIG. 15 is a schematic diagram of the electrodes on the TFT substrate in the fourth embodiment.

Next, a fourth embodiment of the present invention shall be described. Whereas in the third embodiment, the pixel electrodes of the reflective portion and the display portion have respective TFTs connected thereto, in the fourth embodiment of the present invention, the reflective portion and the display portion share a pixel electrode, while the COM electrode of the reflective portion and the COM electrode of the display portion are separate. FIG. 14 is a cross-sectional view of an internal semi-transmissive liquid crystal display device according to the fourth embodiment. FIG. 15 is a schematic diagram of the electrodes on the TFT substrate in the fourth embodiment.

The arrangement of the fourth embodiment shall be described using FIGS. 14 and 15. In FIG. 14, elements identical to those in FIG. 12 have been assigned identical symbols and shall not be discussed in detail. As shown in FIG. 14, in the IPS (In Plane Switching) mode of operation in a lateral electric field in a direction horizontal in relation to the substrate, it is preferable for the liquid crystal interface to be planar, and for this reason a planarizing film 42 is formed over the internal reflecting plate 41. A pixel electrode 25 and a COM electrode 23 of the reflective portion are formed in a comb-tooth configuration on the planarizing film 42; and a pixel electrode 25 and a COM electrode 24 of the transmissive portion are formed in a comb-tooth configuration on the substrate 12 in the transmissive portion 18. The structure of these electrodes is shown in plan view from the upper face of the substrate in FIG. 15. As shown in FIG. 15, the pixel electrodes 25 are connected to a single pixel electrode TFT 26. The COM electrodes, meanwhile, are divided into the COM electrode 23 of the reflective portion 17 and the COM electrode 24 of the transmissive portion 18, making it possible for different voltages to be applied. Since it is possible to independently control the voltages of the reflective portion and the transmissive portion, the operation and working effects are analogous to those of the first embodiment.

Next, a fifth embodiment of the present invention shall be described. In the first through fourth embodiments, cancelling data is displayed on the viewing angle controller in a narrow viewing field mode, and the display content of the display portion is made unviewable beyond a certain viewing angle by the use of the cancelling data displayed on the viewing angle controller. The fifth embodiment of the present invention, however, differs from these embodiments in that the viewing angles are switched by changing the viewing angle characteristics of the viewing angle controller and the display portion so that the viewing angle controller and the display portion perform normal display in a wide viewing field mode, whereas the viewing angle controller performs dark display in a narrow viewing field mode, and normal display is performed in the display portion having narrow viewing field characteristics. FIG. 16 is a cross-sectional view of an internal semi-transmissive liquid crystal display device according to the fifth embodiment. Table 4 is a diagram showing the operation of the reflective portion and the transmissive portion in a wide viewing field mode and a narrow viewing field mode in the fifth embodiment.

TABLE 4

| Wide viewing field mode | | Narrow viewing field mode | |
|---|---|---|---|
| Reflective portion Normal display | Transmissive portion Normal display | Reflective portion Dark | Transmissive portion Normal display |

Figure 16A:
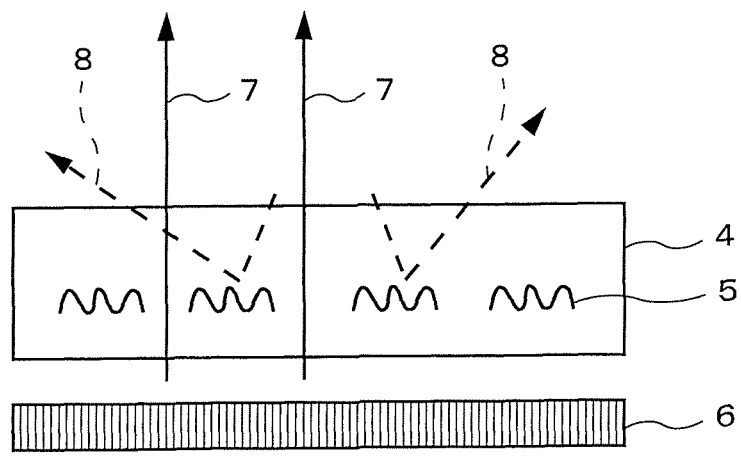
FIG. 16A shows operation during viewing in a wide field.

The arrangement of the fifth embodiment shall be described with reference to FIG. 16. As shown in FIG. 16A, the semi-transmissive liquid crystal display device according to the present embodiment comprises a backlight 6 and an internal semi-transmissive liquid crystal panel 4 positioned over the backlight 6. A reflective portion provided with an internally reflective plate 5, and a transmissive portion for transmitting light that is output from the backlight are disposed in each pixel of the internal semi-transmissive liquid crystal display device, making it possible for different voltages to be applied to the reflective portion and the transmissive portion. Additionally, the reflective portion has the viewing angle characteristics of a wide viewing field that allow a wide viewing field mode to be maintained in an individual manner, while the transmissive portion has the viewing angle characteristics of a narrow viewing field that allow a narrow viewing field mode to be maintained in an independent manner.

Figure 16B:
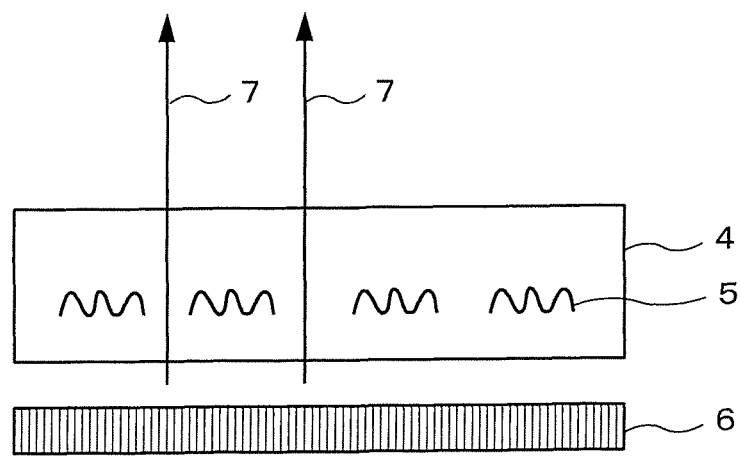
FIG. 16B shows operation during viewing in a narrow field.

As shown in Table 4, normal display is performed by the reflective portion and the transmissive portion in a wide viewing field mode. As shown in FIG. 16A, reflected display light 8 reflected by the internally reflective plate 5 in the reflective portion has the viewing angle characteristics of a wide viewing field, while transmitted display light 7 that is output from the backlight 6 and transmitted through the liquid crystal panel has the viewing angle characteristics of a narrow viewing field. The reflected display light 8 and transmitted display light 7 are combined, producing the viewing angle characteristics of the wide viewing field. As shown in Table 4, in a narrow viewing field mode, the reflective portion performs dark display, while normal display is performed in the transmissive portion. In this case, as shown in FIG. 16B, since display is carried out solely with the viewing angle characteristics of a narrow viewing field display in the transmissive portion, the viewing angle characteristics of the narrow viewing field are attained. Consequently, it is possible to switch the viewing angle between the wide viewing field mode and the narrow viewing field mode by switching the display of the reflective portion. It is sufficient for the viewing angle characteristics of the reflective portion to be characteristics that afford a wide viewing field when combined with the narrow viewing field of the transmissive portion. In the present embodiment, the transmissive portion that performs normal display in the wide viewing field mode and the narrow viewing field mode can be alternatively understood as being the display portion, and the reflective portion used for switching the viewing angle as the viewing angle controller. The viewing angle characteristics of the reflective portion may be arbitrary characteristics derived by designing the reflective plate in a particular way. The viewing angle characteristics of a narrow viewing field in the transmissive portion may be derived through the use of a highly directional backlight, a louver, or the like.

Next, a sixth embodiment of the present invention shall be described. In the fifth embodiment, the reflective portion has the viewing angle characteristics of a wide viewing field while the transmissive portion has the viewing angle characteristics of a narrow viewing field, whereas the sixth embodiment differs therefrom in that the reflective portion has the viewing angle characteristics of a narrow viewing field while the transmissive portion has the viewing angle characteristics of a wide viewing field. FIG. 17 is a cross-sectional view of an internal semi-transmissive liquid crystal display device according to the sixth embodiment. Table 5 is a diagram showing the operation of the reflective portion and the transmissive portion in a wide viewing field mode and a narrow viewing field mode in the sixth embodiment.

TABLE 5

| Wide viewing field mode | | Narrow viewing field mode | |
|---|---|---|---|
| Reflective portion Normal display | Transmissive portion Normal display | Reflective portion Normal display | Transmissive portion Dark |

Figure 17A:
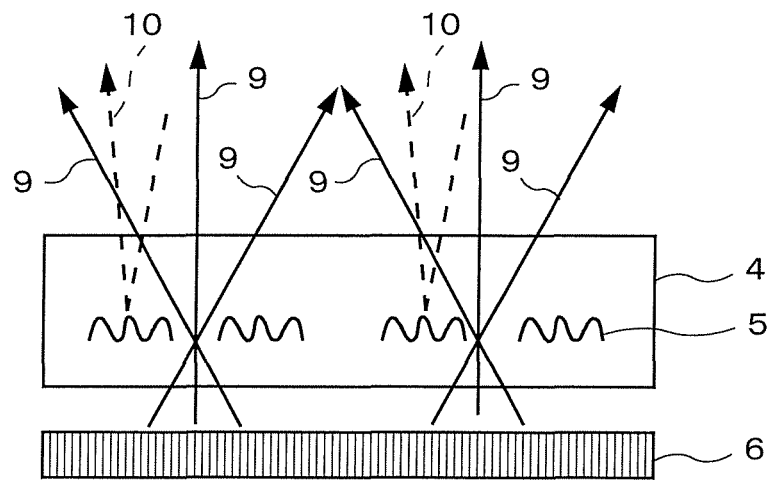
FIG. 17A shows operation during viewing in a wide field.
Figure 17B:
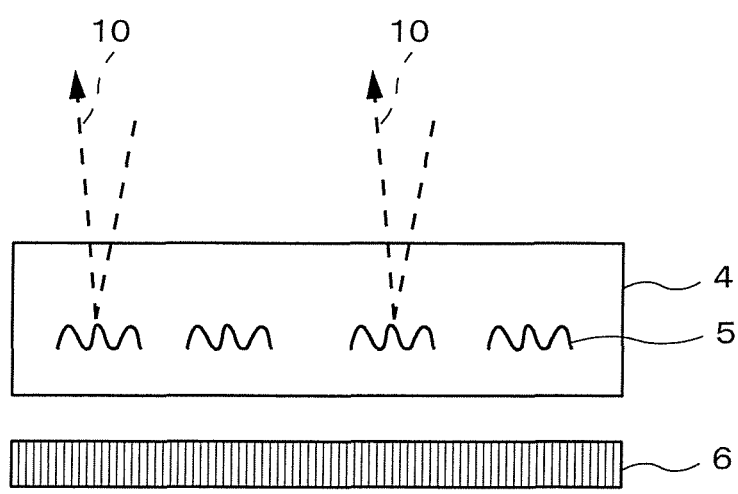
FIG. 17B shows operation during viewing in a narrow field.

In the semi-transmissive liquid crystal display device according to the present embodiment, each single pixel is provided with a reflective portion and a transmissive portion, making it possible to apply different voltages to the reflective portion and the transmissive portion. Additionally, the reflective portion has the viewing angle characteristics of a narrow viewing field display, while the transmissive portion has the viewing angle characteristics of a wide viewing field. As shown in Table 5, normal display is performed in the reflective portion and the transmissive portion in a wide viewing field mode. As shown in FIG. 17A, reflected display light 10 reflected by the internally reflective plate 5 in the reflective portion has the viewing angle characteristics of a narrow viewing field display, while transmitted display light 9 that is output from the backlight 6 and transmitted through the liquid crystal panel has the viewing angle characteristics of a wide viewing field display. The reflected display light 10 and transmitted display light 9 are combined, producing the viewing angle characteristics of the wide viewing field. As shown in Table 5, in a narrow viewing field mode, the reflective portion performs normal display, while the transmissive portion performs dark display. As shown in FIG. 17B, since display is carried out with the viewing angle characteristics of a narrow viewing field in the reflective portion only, the viewing angle characteristics of the narrow viewing field are attained. Consequently, it is possible to switch the viewing angle between the wide viewing field mode and the narrow viewing field mode by switching the display of the transmissive portion. In the present embodiment, the reflective portion that performs normal display in the wide viewing field mode and the narrow viewing field mode can be alternatively understood as being the display portion, and the transmissive portion used for switching the viewing angle as the viewing angle controller.

Figure 18:
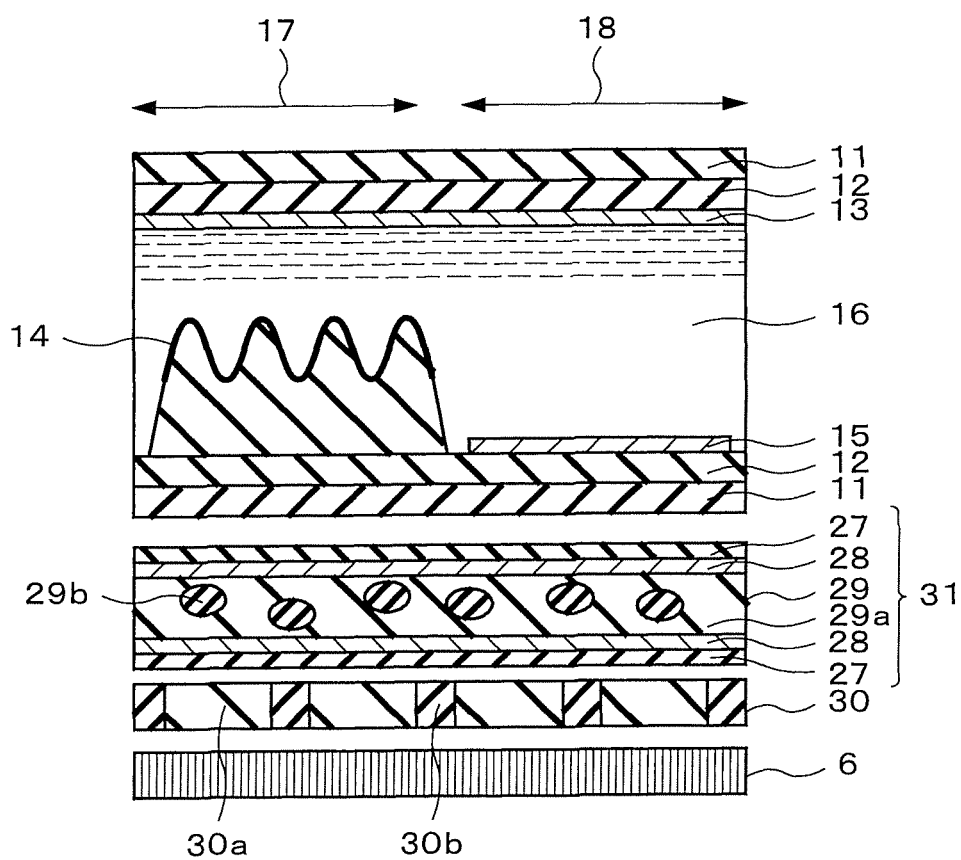
FIG. 18 is a cross-sectional view of an internal semi-transmissive liquid crystal display device according to a seventh embodiment of the present invention.

Next, a seventh embodiment of the present invention shall be described. In the present embodiment, a transmitting/scattering switch element and a louver are disposed between the backlight and the polarizing plate disposed towards the backlight. FIG. 18 is a cross-sectional view of an internal semi-transmissive liquid crystal display device according to the seventh embodiment.

As shown in FIG. 18, in the present embodiment, a backlight 6 is provided, and above the backlight 6 is disposed a louver 30 for regulated output of the direction of light incident from the backlight 6. The louver 30 is composed of transparent regions 30a that transmit light, and absorbent regions 30b that absorb light, arranged in alternating fashion in a direction parallel to the louver 30 surface. A transmitting/scattering switch element 31 switchable between a light transmitting state and a scattering state is disposed above the louver 30. In the transmitting/scattering switch element 31, polymer-dispersed liquid crystals 29 composed of liquid crystal regions 29b dispersed through a polymer film 29a are sandwiched between two electrodes 28 disposed covering the surfaces of substrates 27. A liquid crystal panel is disposed above the transmitting/scattering switch element 31 and is designed in the same way as the liquid crystal panel in the first embodiment, for example. The assigned symbols are the same as for the liquid crystal panel shown in FIG. 7, and no further description is given. In the present embodiment, by providing the transmitting/scattering switch element 31 and the louver 30, the viewing angle can be switched irrespective of the display of the reflective portion 17. Specifically, whereas in the first through fourth embodiments, cancelling data display by the reflective portion sometimes fails to provide sufficient luminance in cases in which outside light is absent or the outside light is weak so that the function of switching the viewing angle is sometimes lost, in the present embodiment, the viewing angle can be switched even under such circumstances.

Switching of the viewing angle is also possible by a method wherein, in a wide viewing field mode, the reflective portion 17 performs normal display or dark display while the transmissive portion 18 performs normal display in the wide viewing field (switched by the transmitting/scattering switch element 31), whereas in a narrow viewing field mode, the reflective portion 17 performs dark display while the transmissive portion 18 performs normal display in the narrow viewing field (switched by the transmitting/scattering switch element 31).

Figure 19:
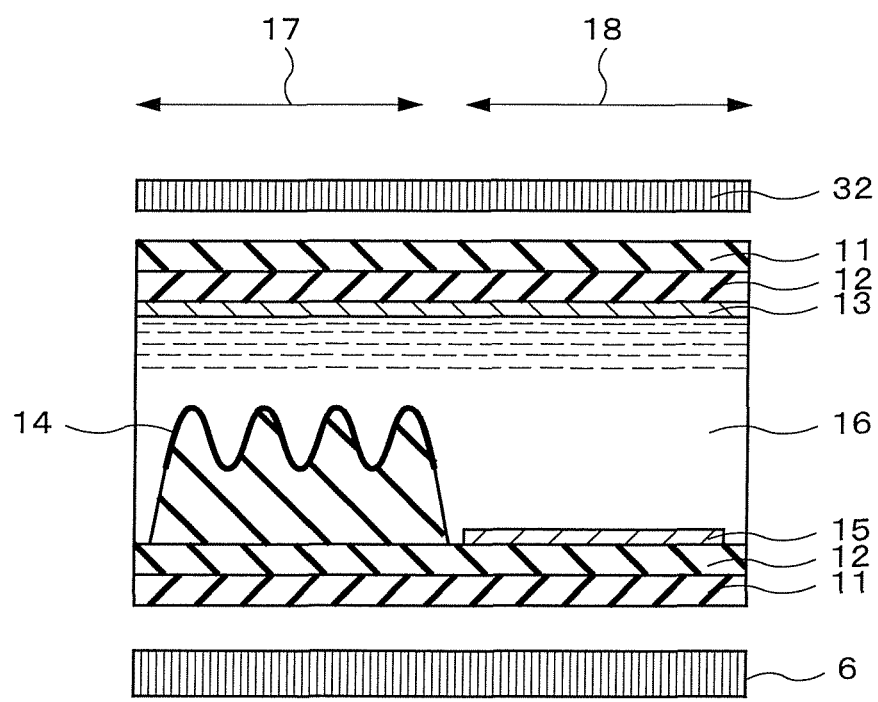
FIG. 19 is a cross-sectional view of an internal semi-transmissive liquid crystal display device according to an eighth embodiment of the present invention.

Next, an eighth embodiment of the present invention shall be described. In the eighth embodiment, a front light is provided on the side facing the observer. FIG. 19 is a cross-sectional view of an internal semi-transmissive liquid crystal display device according to the eighth embodiment. As shown in FIG. 19, a backlight 6 is provided in the present embodiment, and above the backlight 6 is positioned the liquid crystal panel in the first embodiment, for example. A front light 32 is disposed above the liquid crystal panel, and light is directed to be incident on the liquid crystal panel. In the first through sixth embodiments, normal display/dark display by the reflective portion sometimes fails to provide sufficient luminance in cases in which outside light is absent or the outside light is weak so that the function of switching the viewing angle is sometimes lost. However, providing the front light 32 allows the front light 32 to afford sufficient luminance under such circumstances, making it possible to switch the viewing angle.

When the viewing angle controller displays pseudo-color by the reflective portion, it is acceptable for the front light 32 to produce pseudo-colored light similar to the pseudo-color displayed by the viewing angle controller, instead of white light. By having the front light 32 produce pseudo-colored light similar to the pseudo-color displayed by the viewing angle controller, light absorbed by the color filter of the reflective portion that constitutes the viewing angle controller is reduced, and the utilization efficiency of the light of the front light 32 increases. Thus, as long as the luminance is the same as that of the pseudo-colored display of the viewing angle controller, it is possible to lower power consumption by the front light 32.

Figure 20:
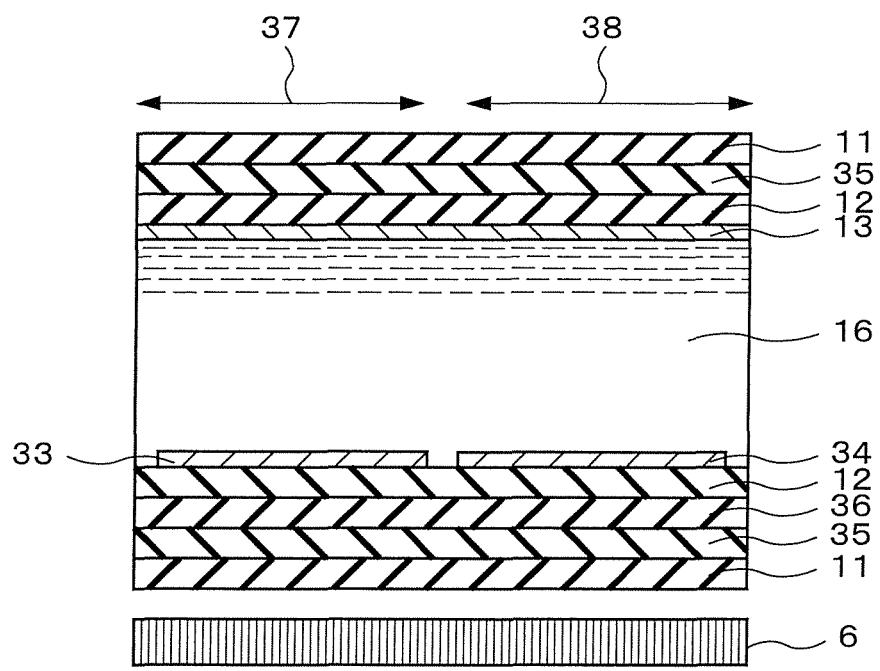
FIG. 20 is a cross-sectional view of an external semi-transmissive liquid crystal display device provided with a polarized light reflecting plate according to a ninth embodiment of the present invention.
Figure 21:
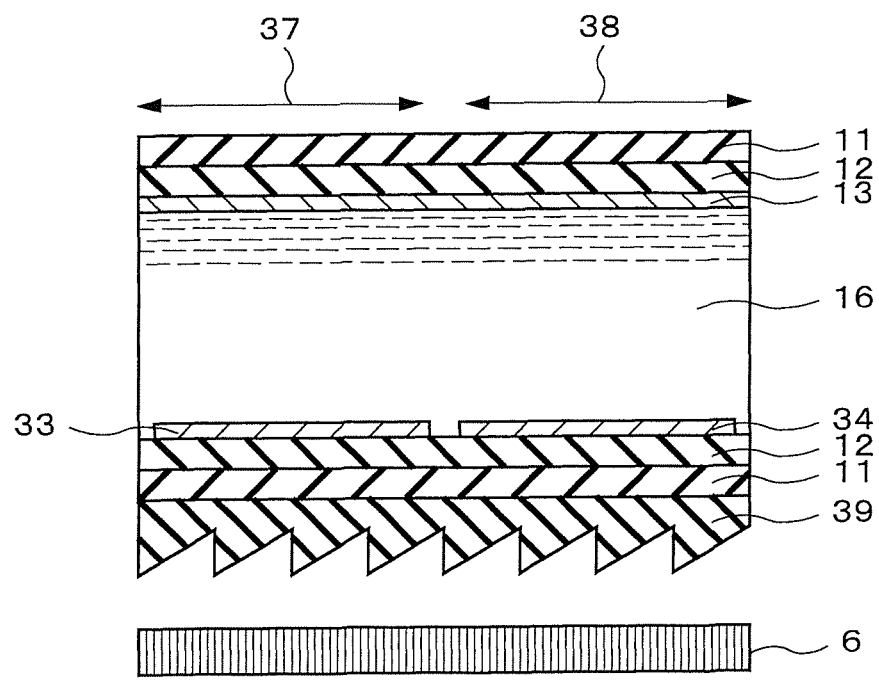
FIG. 21 is a cross-sectional view of an external semi-transmissive liquid crystal display device provided with a semi-transmissive reflecting plate according to a modified example of the ninth embodiment of the present invention.

Next, a ninth embodiment of the present invention shall be described. The ninth embodiment is an external semi-transmissive type, rather than the internal semi-transmissive type up to this point. FIG. 20 is a cross-sectional view of an external semi-transmissive liquid crystal display device provided with a polarized light reflecting plate according to the ninth embodiment. FIG. 21 is a cross-sectional view of an external semi-transmissive liquid crystal display device provided with a semi-transmissive reflecting plate according to a modified example of the ninth embodiment. Table 6 is a first illustration that shows operation of the viewing angle controller and the display portion in a wide viewing field mode and a narrow viewing field mode in the ninth embodiment. Table 7 is a second illustration that shows operation of the viewing angle controller and the display portion in a wide viewing field mode and a narrow viewing field mode in the first embodiment.

First, the arrangement of the ninth embodiment shall be described using FIG. 20. As shown in FIG. 20, a backlight 6 is provided in the present embodiment, and above the backlight 6 is positioned a liquid crystal element having a liquid crystal layer 16 sandwiched by two opposing substrates 12. A phase difference plate 35 is disposed on the upper face of the substrate 12 disposed towards the observer, and a polarizing plate 11 is disposed thereon. A reflective polarizing plate 36 for selectively reflecting a prescribed deflection component of incident light incident from the display screen side is placed on the upper face of the substrate 12 disposed towards the backlight 6; a phase difference plate 35 is provided so as to cover the reflective polarizing plate 36; and additionally a polarizing plate 11 is provided so as to cover the phase difference plate 35. A viewing angle controller pixel electrode 33 and a display portion pixel electrode 34 are separately formed on the substrate 12 disposed toward the backlight 6. The electrodes are formed on the side of the substrate that faces the observer. A shared COM electrode 13 is formed on the opposite side of the substrate 12 disposed opposite the first substrate.

Next, the arrangement of the modified example of the ninth embodiment shall be described using FIG. 21. Two opposing substrates 12 are positioned above a backlight 6, and a liquid crystal layer 16 is sandwiched between the substrates. Polarizing plates 11 are disposed on each of the two substrates 12. The plates are disposed on the sides that are opposite from the sides that face each other. The polarizing plate 11 disposed facing the backlight 6 is provided with a semi-transmissive reflective plate 39. The reflective plate is disposed on the side of the polarizing plate that faces the backlight 6. The liquid crystal display element constitutes a transmissive/reflective portion. The substrate 12 disposed facing the backlight 6 is provided with a viewing angle controller pixel electrode 33 and a display portion pixel electrode 34. The electrodes are formed separately on the side that faces the observer. A shared COM electrode 13 is formed on the opposite side of the substrate 12 positioned opposite the first substrate. FIG. 21, which shows the modified example of the ninth embodiment, is substantially identical in arrangement to the ninth embodiment, apart from the fact that the semi-transmissive reflective plate 39 is used instead of the reflective polarizing plate 36 in FIG. 20.

In the external semi-transmissive type, there is no difference between the reflective portion and the transmissive portion, and the reflective portion and the transmissive portion are integral. However, to switch the viewing angle, each single pixel is provided with a viewing angle controller 37 used primarily for reflective display, and a display portion 38 used primarily for transmissive display. To make it possible for different voltages to be applied to the viewing angle controller 37 and the display portion 38, either the pixel electrodes are divided and provided with respective TFTs, as in the first or third embodiments, or the COM electrodes are divided and controlled independently, as in the second or fourth embodiments.

Next, the operation and effects of the ninth embodiment and the modified example thereof shall be discussed using Table 6. As shown in Table 6, both the display portion and the viewing angle controller perform normal display well in a wide viewing field mode. On the other hand, in a narrow viewing field mode, the display portion performs normal display, but the viewing angle controller assumes the bright state. A design is therefore adopted so that the luminance of the viewing angle controller is greater than the luminance of the display portion beyond a specific viewing angle, in the same way as FIG. 9, which shows the viewing angle-luminance characteristics of the first embodiment, making it possible for the display content of the display portion to be viewed from beyond the specific viewing angle. Consequently, it is possible to switch the viewing angle between the wide viewing field mode and narrow viewing field mode by switching the display of the viewing angle controller. As shown in Table 7, in a wide viewing field mode, the display portion may perform normal display while the viewing angle controller performs dark display (black display).

TABLE 6

| Wide viewing field mode | | | Narrow viewing field mode | | |
|---|---|---|---|---|---|
| | Viewing angle controller | Display portion | | Viewing angle controller | Display portion |
| Transmission | Normal display | Normal display | Transmission | Bright | Normal display |
| Reflection | Normal display | Normal display | Reflection | Bright | Normal display |

In a narrow viewing field mode, the viewing angle controller is not limited to the bright condition (white display) of the three pixels RGB, and intermediate luminance or pseudo-color display is also acceptable as long as the display content of the display portion is unviewable from within the range 3 of restricted viewing angles. In a wide viewing field mode, display may be performed with the viewing angle controller and the display portion of one pixel functioning as two pixels.

Next, a tenth embodiment of the present invention shall be described. In the first through fourth and the ninth embodiments, the viewing angle controllers of all of the pixels of the liquid crystal panel display cancelling data in a narrow viewing field mode. In the tenth embodiment of the present invention, however, even in a narrow viewing field mode the viewing angle controllers of some of the pixels of the liquid crystal panel perform normal display or black display.

TABLE 7

| Wide viewing field mode | | | Narrow viewing field mode | | |
|---|---|---|---|---|---|
| | Viewing angle controller | display portion | | Viewing angle controller | Display portion |
| Transmission | DARK | Normal display | Transmission | Bright | Normal display |
| Reflection | dark | Normal display | Reflection | Bright | Normal display |

FIG. 22 is a diagram showing the operation in the viewing angle controller and the pixel units of the display portion in a wide viewing field mode and a narrow viewing field mode of the first to fourth and ninth embodiments. FIG. 23 is a diagram showing the operation in the viewing angle controller and the pixel units of the display portion in a narrow viewing field mode in the tenth embodiment.

Figure 22A:
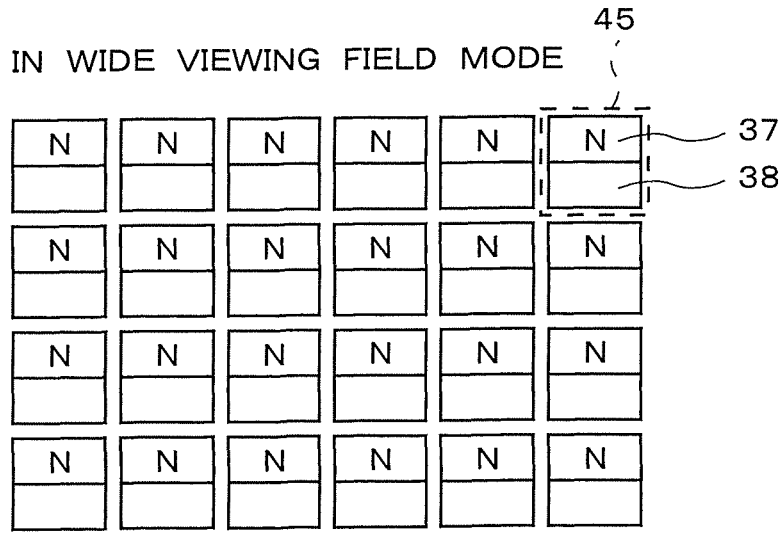
FIG. 22 is a diagram showing the operation in the viewing angle controller and the pixel units of the display portion in a wide viewing field mode (FIG. 22A) and a narrow viewing field mode (FIG. 22B) of the first to fourth and ninth embodiments of the present invention.
Figure 22B:
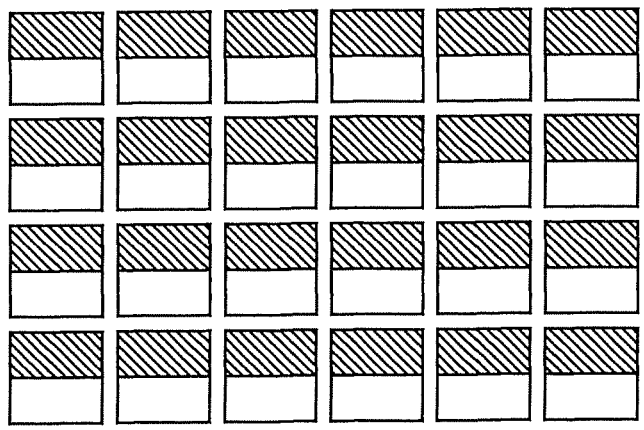
Figure 23A:
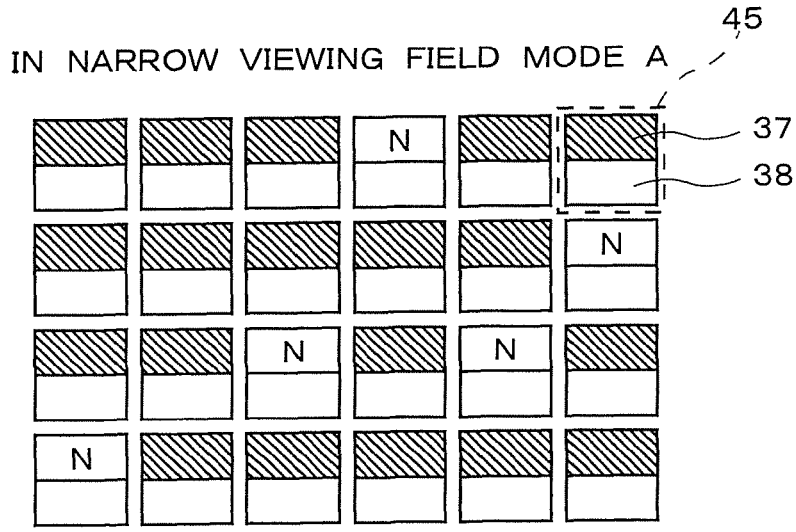
FIG. 23A shows operation of some of the viewing angle controllers performing normal display.

As shown in FIG. 22A, in the first to fourth and the ninth embodiments, the viewing angle controller 37 of the pixel 45 performs normal display or black display, and the display portion 38 performs normal display in a wide viewing field mode for all of the pixels of the liquid crystal panel. As shown in FIG. 22B, the viewing angle controller 37 of the pixel 45 performs cancelling data display, and the display portion 38 performs normal display in a narrow viewing field mode for all of the pixels of the liquid crystal panel.

In the tenth embodiment of the present invention, operation during viewing in a wide field is the same as that shown in FIG. 22A. In a narrow viewing field mode, however, some of the viewing angle controllers 37 perform normal display or black display in the manner shown in FIG. 23A, rather than the viewing angle controllers 37 of all of the pixels of the liquid crystal panel performing cancelling data display. At this time, there is a visible difference between the normal display and cancelling data display, or the black display and cancelling data display of the viewing angle controllers, when viewed from a wide angle range having a restricted viewing angle. Consequently, the normal display or black display is arranged as a design, a picture, or other such image pattern in the viewing angle controllers in the narrow viewing field mode, making it possible to produce an image pattern viewable from a wide angle range having a restricted viewing angle.

Figure 23B:
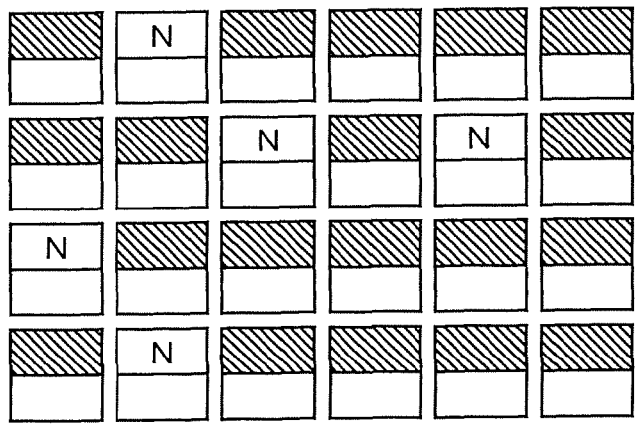
FIG. 23B shows operation of varying the image pattern.

With the method described above, initially the image pattern will be observed in a narrow viewing field mode when a fixed image pattern viewable from a wide angle range having a restricted viewing angle is displayed, but as the eye becomes accustomed it will become possible to view the display content of the display portions of pixels whose viewing angle controllers are performing normal display or black display. In order to prevent this, at certain time intervals the image pattern moves or flashes, or a different image pattern is displayed (FIG. 23B). That is, in preferred practice, the image pattern produced at the through placement of normal display or black display by the viewing angle controllers in a narrow viewing field mode will vary spatially, temporally, or spatiotemporally.

Next, an eleventh embodiment of the present invention shall be described. In the fifth and sixth embodiments, the viewing angle controller performs dark display in a narrow viewing field mode in all of the pixels of the liquid crystal panel. In the eleventh embodiment of the present invention, however, normal display is performed by the viewing angle controller in some of the pixels of the liquid crystal panel even in a narrow viewing field mode.

FIG. 24 is a diagram showing the operation in the viewing angle controller and the pixel units of the display portion in a wide viewing field mode and a narrow viewing field mode of the fifth and sixth embodiments. FIG. 25 is a diagram showing the operation in the viewing angle controller and the pixel units of the display portion in a narrow viewing field mode in the eleventh embodiment.

Figure 24A:
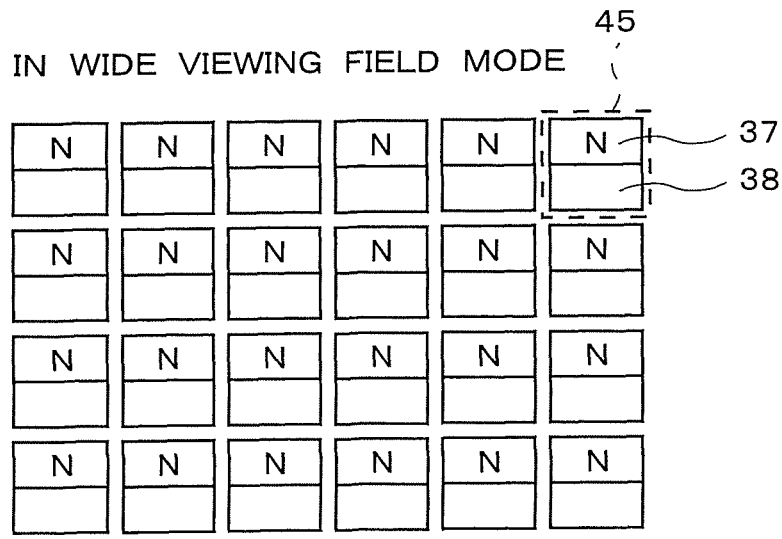
FIG. 24 is a diagram showing the operation in the viewing angle controller and the pixel units of the display portion in a wide viewing field mode (FIG. 24A) and a narrow viewing field mode (FIG. 24B) of the fifth and sixth embodiments of the present invention.
Figure 24B:
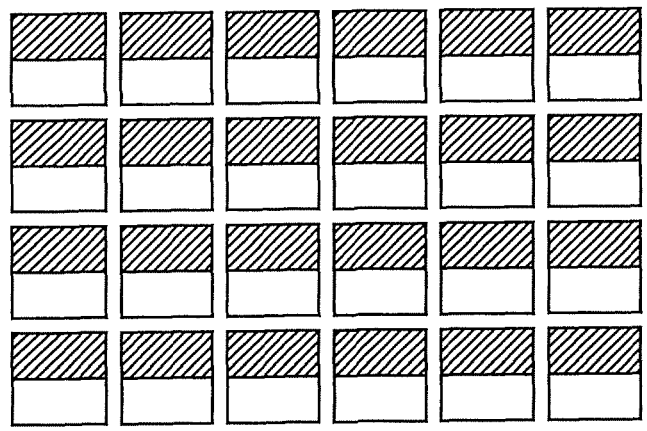
Figure 25A:
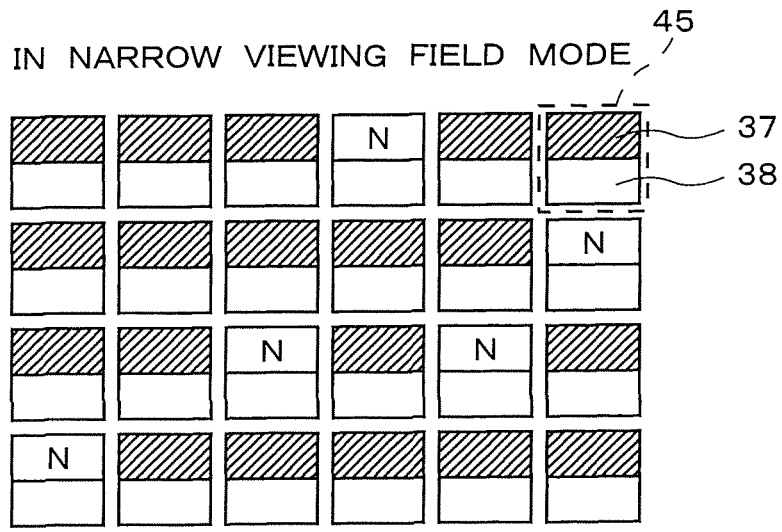
FIG. 25A shows operation of some of the viewing angle controllers performing normal display.

As shown in FIG. 24A, in the fifth and sixth embodiments, the viewing angle controller 37 of the pixel 45 performs normal display, and the display portion 38 performs normal display in all of the pixels of the liquid crystal panel in a wide viewing field mode. As shown in FIG. 24B, the viewing angle controller 37 of the pixel 45 performs black display, and the display portion 38 performs normal display in all of the pixels of the liquid crystal panel in a narrow viewing field mode.

Figure 25B:
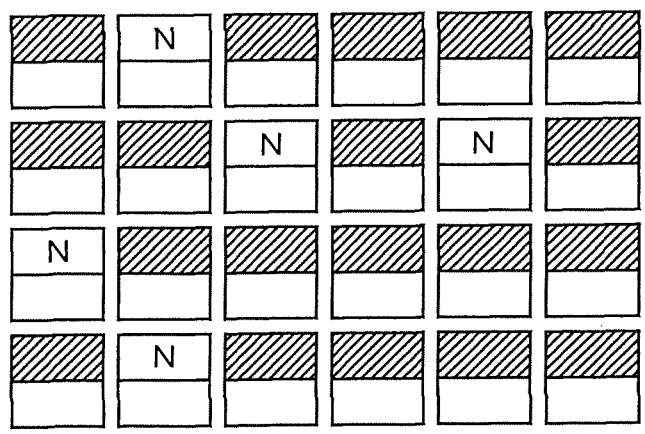
FIG. 25B shows operation of varying the image pattern.

In the eleventh embodiment of the present invention, on the other hand, operation during viewing in a wide field is the same as that shown in FIG. 24A. In a narrow viewing field mode, however, some of the viewing angle controllers perform normal display (FIG. 25A) rather than the viewing angle controllers of all of the pixels of the liquid crystal panel performing normal display. At this time, there is a visible difference between normal display and black display by the viewing angle controllers 37 when viewed from a wide angle range having a restricted viewing angle. Consequently, the normal display is arranged as a design, a picture, or other such image pattern in the viewing angle controllers 37 in the narrow viewing field mode, making it possible to produce an image pattern viewable from a wide angle range. As in the tenth embodiment, at certain time intervals the image pattern may move or flash, or a different image pattern may be displayed (FIG. 25B).

Figure 26:
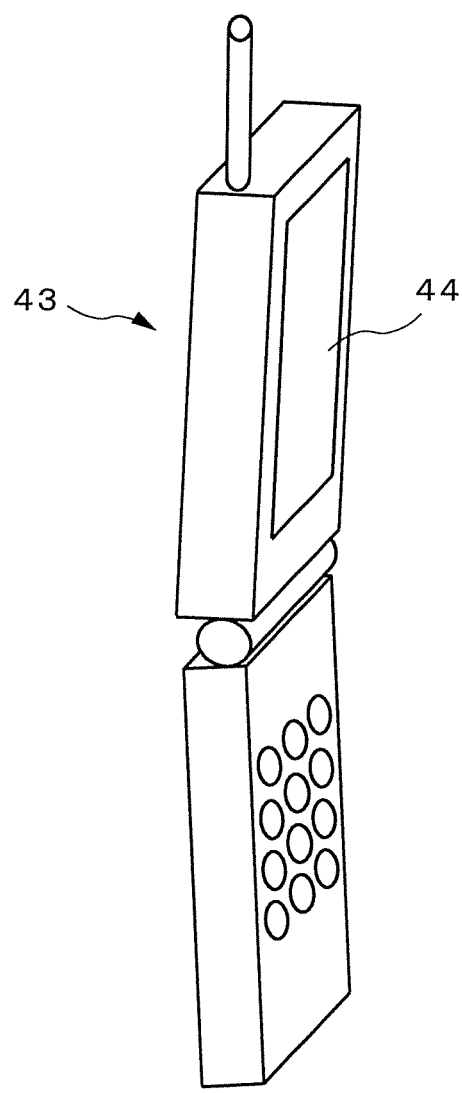
FIG. 26 is a perspective view showing a portable terminal device equipped with the liquid crystal display device according to a twelfth embodiment of the present invention.

FIG. 26 is a perspective view showing a portable terminal device equipped with the liquid crystal display device according to a twelfth embodiment of the present invention. As shown in FIG. 26, the liquid crystal display portion 44 of the present invention may be installed in a mobile phone 43, for example. The liquid crystal display device of the present invention can be implemented favorably in a mobile phone or other such portable device, making it possible to switch the viewing angle display in the display device installed in the portable device. The portable device is not limited to a mobile phone, and the invention can be implemented advantageously in portable devices of various kinds, such as PDAs, game devices, digital cameras, digital video cameras, and the like.

What is claimed is:

1. A semi-transmissive liquid crystal display device comprising:
   a liquid crystal panel provided with a liquid crystal layer between two substrates having electrodes formed thereon;
   a backlight for outputting light to the liquid crystal panel; and
   a controller for controlling a voltage applied to the liquid crystal layer; wherein
   each of pixels of the liquid crystal panel individually has a reflective portion for reflecting and displaying light incident from the display screen side, and a transmissive portion for transmitting and displaying light that is output by said backlight;
   a normal display by the reflective portion has wide viewing angle characteristics, solely viewable in a wide viewing area, and a normal display the transmissive portion has narrow viewing angle characteristics, solely viewable only in a narrow viewing area, and
   the controller controls, independently for said reflective portion and the transmissive portion, the voltage applied to the liquid crystal layer, and switches a viewing angle between a wide viewing field mode and a narrow viewing field mode by performing control so that, in the wide viewing field mode, the reflective portion performs the normal display while the transmissive portion performs the normal display, thereby allowing the normal display by the reflective portion to be viewable in the wide viewing area, whereas in the narrow viewing field mode the reflective portion performs a dark display while the transmissive portion performs the normal display thereby allowing the normal display by the transmissive portion to be viewable only in the narrow viewing area,
   wherein the reflective portions of part of the pixels perform normal display instead of dark display in the narrow viewing field mode, so that an image pattern is displayed and wherein the display of the image pattern in the narrow viewing field mode varies spatially, temporally, or spatiotemporally.

2. A semi-transmissive liquid crystal display device comprising:
   a liquid crystal panel provided with a liquid crystal layer between two substrates having electrodes formed thereon;
   a backlight for outputting light to the liquid crystal panel; and
   a controller for controlling a voltage applied to the liquid crystal layer; wherein
   each of pixels of the liquid crystal panel individually has a reflective portion for reflecting and displaying light incident from the display screen side, and a transmissive portion for transmitting and displaying light that is output by the backlight;
   a normal display by the reflective portion has narrow viewing angle characteristics, solely viewable only in a narrow viewing area, and the transmissive portion has wide viewing angle characteristics, solely viewable in a wide viewing area, and
   the controller controls, independently for the reflective portion and the transmissive portion, the voltage applied to the liquid crystal layer, and switches a viewing angle between a wide viewing field mode and a narrow viewing field mode by performing control so that in the wide viewing field mode the reflective portion performs the normal display, thereby allowing the normal display by the transmissive portion to be viewable in the wide viewing area, while said transmissive portion performs normal display, whereas in the narrow viewing field mode the reflective portion performs the normal display while said transmissive portion performs a dark display, thereby allowing the normal display by the reflective portion to be viewable only in the narrow viewing area,
   wherein the transmissive portions of part of the pixels perform normal display instead of dark display in the narrow viewing field mode, so that an image pattern is displayed and wherein the display of the image pattern in the narrow viewing field mode varies spatially, temporally, or spatiotemporally.

3. A portable terminal device comprising the semi-transmissive liquid crystal display device according to claim 1.

4. A portable terminal device comprising the semi-transmissive liquid crystal display device according to claim 2.

* * * * *